US006818595B2

(12) United States Patent
Benton et al.

(10) Patent No.: US 6,818,595 B2
(45) Date of Patent: Nov. 16, 2004

(54) DRILLING FLUIDS CONTAINING AN ALKALI METAL FORMATE

(75) Inventors: William J. Benton, Magnolia, TX (US); John A. Toups, Sugar Land, TX (US); U. Roger Weems, Willis, TX (US)

(73) Assignee: Cabot Specialty Fluids, Inc., The Woodlands, TX (US)

( * ) Notice: Subject to any disclaimer, the term of this patent is extended or adjusted under 35 U.S.C. 154(b) by 0 days.

(21) Appl. No.: 10/076,209

(22) Filed: Feb. 14, 2002

(65) Prior Publication Data

US 2003/0162669 A1 Aug. 28, 2003

Related U.S. Application Data

(60) Provisional application No. 60/268,520, filed on Feb. 14, 2001.

(51) Int. Cl.$^7$ .............................. C09K 7/02; C09K 7/06
(52) U.S. Cl. ....................... 507/103; 507/138; 507/140; 507/141; 507/145
(58) Field of Search ................................ 507/103, 138, 507/140, 141, 145

(56) References Cited

U.S. PATENT DOCUMENTS

| | | | |
|---|---|---|---|
| 4,440,649 A | 4/1984 | Loftin et al. .................. 252/8.5 |
| 4,519,923 A | 5/1985 | Hori et al. ................ 252/8.5 C |
| 4,536,297 A | 8/1985 | Loftin et al. .................. 252/8.5 |
| 4,647,859 A | 3/1987 | Son et al. .................... 324/323 |
| 4,900,457 A | 2/1990 | Clarke-Sturman et al. ........................ 252/8.514 |
| H935 H * | 7/1991 | Rines .......................... 507/103 |
| 5,184,679 A | 2/1993 | Lau ............................. 507/241 |
| 5,358,049 A * | 10/1994 | Hale et al. ................... 166/293 |
| 5,379,840 A | 1/1995 | Cowan et al. ............... 166/292 |
| 5,620,947 A | 4/1997 | Elward-Berry .............. 507/229 |
| 5,635,458 A | 6/1997 | Lee et al. .................... 507/240 |
| 5,708,107 A | 1/1998 | Ahmed et al. ............... 526/263 |
| 5,723,416 A | 3/1998 | Liao ............................ 507/110 |
| 5,785,747 A | 7/1998 | Vollmer et al. .......... 106/194.2 |
| 5,804,535 A | 9/1998 | Dobson et al. ............. 507/111 |
| 5,855,244 A | 1/1999 | Ahmed et al. .............. 166/295 |
| 5,962,375 A | 10/1999 | Sawdon et al. |
| 6,006,831 A | 12/1999 | Schlemmer et al. ... 166/250.01 |
| 6,015,535 A | 1/2000 | Brown et al. ............... 423/179 |
| 6,100,222 A | 8/2000 | Vollmer et al. ............. 507/113 |
| 6,124,244 A | 9/2000 | Murphey ..................... 507/111 |
| 6,127,319 A | 10/2000 | House |
| 6,137,005 A | 10/2000 | Hj.o slashed.rnevik ..... 562/609 |
| 6,156,708 A | 12/2000 | Brookey et al. ............ 507/102 |
| 6,177,014 B1 | 1/2001 | Potter et al. ................ 210/651 |
| 6,194,355 B1 | 2/2001 | Jarrett et al. ................ 507/140 |
| 6,239,081 B1 | 5/2001 | Korzilius et al. |
| 6,248,700 B1 | 6/2001 | Vollmer et al. ............. 507/277 |
| 6,339,048 B1 * | 1/2002 | Santhanam et al. ......... 507/131 |
| 6,422,325 B1 * | 7/2002 | Krieger ........................ 175/50 |
| 6,562,764 B1 * | 5/2003 | Donaldson et al. ......... 507/277 |
| 6,589,917 B2 * | 7/2003 | Patel et al. .................. 507/138 |
| 2001/0036905 A1 | 11/2001 | Parlar et al. ................. 507/200 |
| 2002/0117457 A1 | 8/2002 | Benton et al. ............... 210/749 |

FOREIGN PATENT DOCUMENTS

| | | | |
|---|---|---|---|
| EP | 0 621 329 A1 | 10/1994 | ............ C09K/7/02 |
| GB | 2277338 | 10/1994 | |
| GB | 2314865 | 1/1998 | |
| RU | 2070415 C1 | 12/1996 | ............ C02F/1/52 |
| WO | WO 90/11972 | 10/1990 | |
| WO | WO 94/09253 | 4/1994 | |
| WO | WO 96/31435 | 10/1996 | |
| WO | WO 97/26311 | 10/1996 | ............ C01D/17/00 |
| WO | WO 99/48994 | 9/1999 | |
| WO | WO 01/59256 A1 | 8/2001 | |

OTHER PUBLICATIONS

Hallman, John H., "Use of Formate–Based Fluids for Drilling and Completion," Offshore, Petroleum Publishing Co., Tulsa, US, vol. 56, No. 8, pp. 63–64:82:84, (Aug. 1, 1996).
International Search Report for PCT/US 02/04366.
Howard, S.K., Annu. Spe. Tech. Conf., "Formate Brines for Drilling and Completion: State of the Art," (Dallas, 10/22–25/95) PROC (Drilling and Completion), pp. 483–496, 1995, (SPE–30498; 13 Refs.). (Abstract Only).
Hallman, J.H. 8$^{th}$ Annu. Petrol Network Educ. Conf. (PNEC), "Formates in Practice: Field Use and Reclamation," (Houston, 9/9–11/96), PROC Pap. No. 11, 1996, (13 pp.; 12 Refs.). (Abstract Only).
Hallman, J.H., Oilchem RES/ACS New Oilfield Chem Technmol Conf (New Orleans, Mar. 29, 1996), PROC–Pap. No. 7, 1996, (9pp; 6 Refs.). (Abstract Only).
Downs, J.D. et al., 2$^{nd}$ Spe. et al. Health, Safety & Environ. in Oil & Gas Prod Int. Conf., "Development of Environmentally Benign Formate–Based Drilling and Completion Fluids," (Jakarta, Indon., 1/25–27/94), PROC V 1, pp. 419–428, 1994, (SPE–27143; 11Refs). (Abstract Only).
Hallman, J.H., World Oil, "Formates in Practice: Field Use and Reclamation," V217, No. 10, pp. 81–82, 85–86, 88–90, Oct. 1996, (ISSN 00438790; Color; 12 Refs.).

* cited by examiner

Primary Examiner—Philip C. Tucker

(57) ABSTRACT

A drilling fluid or mud is described wherein the drilling fluid contains at least one alkali metal formate or monovalent carboxylic acid salt. The drilling fluid preferably further contains at least one emulsifier or surfactant and at least one hydrocarbon-based fluid. The drilling fluids of the present invention can contain other conventional ingredients. The present invention permits drilling fluids to be essentially solids free due to the use of the alkali metal formate.

22 Claims, No Drawings

DRILLING FLUIDS CONTAINING AN ALKALI METAL FORMATE

This application claims the benefit under 35 U.S.C. §119(e) of prior U.S. Provisional Patent Application No. 60/268,520 filed Feb. 14, 2001, which is incorporated in its entirety by reference herein.

BACKGROUND OF THE INVENTION

The present invention relates to the drilling industry and more particularly relates to drilling fluids used in drilling, such as the drilling of a well for the recovery of hydrocarbons or other materials.

In drilling operations, such as the drilling that occurs in oil field operations, drilling fluids are designed/formulated to serve several functions. These functions include acting as a lubricant to the drill bit to reduce wear and friction during drilling and also to seal the formation surface by forming a filter cake. Currently, in the industry, both oil-based muds (OBMs) and water based muds (WBMs) are typically used. More commonly, synthetic based muds (SBMs) are also used in drilling operations. In the drilling fluid, agents for lubrication are present as well as weighting materials in order to achieve a density that typically produces a pressure greater than the surrounding pressure in the well bore. Furthermore, the drilling fluid will also contain a sealing or fluid loss agent, such as calcium carbonate for pore bridging especially polysaccharides and other polymers, in order to form the filter cake on the formation surface of the well bore. In addition, when the drilling fluids are used during drilling, the drilling fluid will also contain drilling fines, such as shale and sandstone fines. During the drilling operations and afterwards, the filter cake seals the formation surface of the well bore so that the well bore can be completely formed without any leakage from the formation surface into the well bore and/or without any leakage of the drilling fluids into the formation surface. While the filter cake is beneficial for these reasons, once the drilling is completed, and the recovery of hydrocarbons is the next step, the filter cake can act as a severe impediment to the recovery of hydrocarbons. For instance, the filter cake can prevent the recovery of hydrocarbons from the formation surfaces which have been blocked or sealed by the filter cake. Furthermore, when injectors are used to retain reservoir pressures, the injection of sea water, for instance, can be significantly reduced due to the filter cake preventing the sea water from entering the formation and hence restricting the flow of water into the reservoir. Accordingly, the industry prefers to remove the filter cake from the well bore in order to optimize productivity. If the filter cake is not removed, the filter cake can block the pores that are part of the formation surface of the well bore which will interfere with the recovery of hydrocarbons. In many drilling operations, the drilling fluid can contain up to 5% by weight of a pore bridging material such as calcium carbonate. Calcium carbonate (CaCO3) is typically a blend of particle sizes with a particle size distribution designed to optimize the bridging of the pores found in the formation. The pore size distribution of the formation is determined from its permeability, preferably by direct porosity and permeability measurements of core plugs extracted from the reservoir.

Once drilling operations have been completed, the well is prepared for the completion operations whereby the mud used for drilling is often displaced by a completion fluid. Completion fluids are typically water based clear fluids and are formulated to the same density as the mud used to drill the well in order to retain the hydraulic pressure on the well bore. There are numerous methods of completing a well, amongst which are open hole completions and gravel packed screened systems. The clear fluids are typically halide based brines such as calcium bromide, calcium chloride, and zinc bromide; or organic based brines such as the formate based fluids.

In drilling an oil or gas well, the use of hydrocarbon-based drilling fluids are greatly preferred because of the inherent advantages of having an external phase fluid in contact with the formation. However, one severe disadvantage to a hydrocarbon-based drilling fluid is that weighting materials, such as barite, calcium carbonate, or hematite must be added to increase the density of the fluid. These weighting-material solids are capable of inducing formation damage to producing formations.

Thus, there is a need to provide hydrocarbon-based drilling fluids that are preferably solids free or have low solids in the contents in the drilling fluid in order to avoid the above-mentioned disadvantages.

SUMMARY OF THE PRESENT INVENTION

A feature of the present invention is to provide drilling fluids which are solids free or contain low amounts of solids in the drilling fluids.

Another feature of the present invention is to provide drilling fluids which are a hydrocarbon-water emulsion which are suitable for use as drilling fluids.

A further feature of the present invention is to provide drilling fluids which can have a variety of different densities in order to be useful in a variety of drilling situations depending on drilling depth and/or other variables.

Another feature of the present invention is to provide a more environmentally friendly drilling fluid that can be primarily aqueous based.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a drilling fluid which contains at least one alkali metal formate and preferably at least one surfactant. Additional alkali metal formates, wetting agents, hydrocarbons, solid weighting materials, sealing or fluid loss agents, filtration control agents, and/or polymers to further control viscosity and/or other conventional additives such as organoclays and the like can also be optionally present for purposes of the present invention.

The present invention further relates to a method to drill a well comprising drilling of a well in the presence of the above-mentioned drilling fluid of the present invention.

The present invention further relates to a method to minimize or eliminate solids in a drilling fluid by substituting at least a portion of the solids weighting material with at least one alkali metal formate and preferably at least one surfactant.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to drilling fluids for use in drilling operations. For instance, the drilling fluid can be used in the drilling of a well for hydrocarbon recovery such as oil and/or gas. The drilling fluids of the present invention can also be used in other drilling operations where drilling fluids are used.

The drilling fluid of the present invention contains at least one alkali metal formate or monovalent carboxylic acid salt and preferably at least one surfactant or emulsifier. The drilling fluid of the present invention can contain an emulsion of an aqueous-based solution with a hydrocarbon-based fluid for purposes of forming the drilling fluid wherein the drilling fluid contains at least one alkali metal formate and preferably at least one surfactant along with at least one hydrocarbon-based fluid.

Preferably, the drilling fluid contains cesium formate as the alkali metal formate. More preferably, the drilling fluid contains two or more alkali metal formates, wherein preferably one of the alkali metal formates is cesium formate. A preferred combination of formates includes, but is not limited to, cesium formate with potassium formate. Other combinations of alkali metal formates can be used, such as sodium formate and potassium formate or sodium formate and cesium formate. Essentially, any combination of one or more monovalent carboxylic salts can be used for purposes of the drilling fluids of the present invention.

The alkali metal formates are commercially available. For instance, the cesium formate can be obtained from Cabot Corporation. The cesium formate can be made, for instance, by following the description as set forth in International Published Patent Application No. WO 96/31435, incorporated in its entirety by reference herein. The cesium formate that is present in the drilling fluid, preferably as a soluble salt, as stated above, can be present in any concentration and the cesium formate solution is a liquid at room temperature. Therefore, the concentration of the cesium formate in the drilling fluid can be from about 1% to about 100% by weight, and more preferably is present in an amount of from about 40% to about 95% by weight, and even more preferably is present in the drilling fluid at a range of from about 55% to about 85% by weight or is present in the drilling fluid at a range of from about 70% to about 85% by weight based on the weight of the drilling fluid. Besides the optional ingredients and preferably the surfactant and/or hydrocarbon fluid, the remainder of the drilling fluid can be water or other aqueous solutions. Conventional ingredients used in drilling fluids can also be used with the drilling fluid of the present invention.

Other alkali metal formates that can be used in the present invention are potassium formate and sodium formate which are commercially available. These alkali metal formates can also be prepared in a similar fashion as the cesium formate solution described above, and are also frequently obtained as by-products from ester hydrolysis.

Preferably, with respect to the drilling fluid of the present invention, at least 35% by volume of the fluid in the drilling fluid is an aqueous-based solution containing at least one alkali metal formate. More preferably, at least 50% by volume of the fluids present in the drilling fluid is an aqueous-based solution containing at least one alkali metal formate and even more preferably at least 75% by volume of the fluids present in the drilling fluid of the present invention is an aqueous-based solution containing at least one alkali metal formate. Most preferably, at least 90% by volume of the fluids present in the drilling fluid of the present invention is an aqueous-based solution containing at least one alkali metal formate. In another embodiment, at least 95% or more by volume of the fluids of the present invention contain an aqueous-based solution containing at least one alkali metal formate. In one embodiment, all of the fluids present are an aqueous-based solution containing at least one alkali metal formate wherein essentially no hydrocarbon, or oil is present in the drilling fluid. Since the alkali formate is preferably dissolved in the aqueous solution, the drilling fluid can be solids free since the alkali formate preferably acts as a lubricant and a weighting material.

When a hydrocarbon fluid or synthetic mud fluid is present in the drilling fluids of the present invention, conventional hydrocarbon fluids or synthetic mud fluids can be used in the drilling fluids of the present invention. Examples include, but are not limited to, diesel oil such as diesel oil number 2, crude oil, synthetic oils (such as paraffin oils, olefin oils, vegetable oils, and the like), as well as other conventional hydrocarbon fluids. Combinations of various hydrocarbon fluids or synthetic mud fluids can be used for purposes of the present invention. If a hydrocarbon or synthetic mud fluid is present in the drilling fluid of the present invention, various ratios of the hydrocarbon fluid to the aqueous-based solution described above can be used, such as ratios of 65% by volume hydrocarbon fluid: 35% aqueous based solution to 1% by volume hydrocarbon fluid: 99% by volume aqueous based solution.

When a hydrocarbon fluid is present with the aqueous-based solution containing at least one alkali metal formate, at least one emulsifier or surfactant is preferably present in order to produce an emulsion of the ingredients. Essentially any emulsifier(s) or surfactant(s) capable of forming an emulsion between the hydrocarbon fluid and the aqueous based solution can be used for purposes of the present invention. Examples include, but are not limited to, a dimer trimer acid such as Witco DTA 350, imidazoline, tall oil (stearic acid), Integrity Synvert IV, Integrity Synvert TWA, and the like. Any amount of surfactant or emulsifier can be used to form the emulsion such as from about 1 to about 30 pounds per barrel, wherein a barrel is about 42 gallons.

Other optional ingredients that can be present in the drilling fluids of the present invention include a filtration control agent or pore bridging materials such as Gilsonite and the like. These filtration control agents can be used in conventional amounts.

Other ingredients that can be present in the drilling fluids of the present invention include solid weighting materials such as barite, hematite, and/or calcium carbonate. These solid weighting materials can be used if desired. The amount of solid weighting material, which is optional, can be from about 0.5 pound per barrel to about 500 pounds per barrel.

Another optional ingredient in the drilling fluids of the present invention is a wetting agent which can be helpful in emulsifying the alkali metal formate fluids with the hydrocarbon-based external fluids. An example of a suitable wetting agent is Integrity Synvert TWA. Conventional amounts can be used in combination with the emulsifiers described above in order to achieve desired emulsions of the formate fluids with the hydrocarbon-base external fluids.

Other ingredients that can optionally be present include, but are not limited to, other drilling fluid products such as polymer(s) to add to viscosity, hydrophilic clays, organophilic clays, fluid loss control additives, amine-treated clays, clays treated such that they provide viscosity in non-aqueous fluids, and the like. These other optional ingredients can be used in conventional amounts known to those skilled in the art.

The alkali metal formate that is present as part of the aqueous-based solution can be not fully saturated in the aqueous-based solution so as to permit any remaining water-soluble components to preferably solubilize in the solution along with the alkali metal formate. Thus, the alkali metal formate that is present in the aqueous-based solution can be present in an amount of less than 80% by weight, based on the aqueous-based solution basis, and more preferably is from about 60% to about 80% by weight.

The important advantage of the present invention is the ability for the density of the drilling fluid to be adjusted to any desired density. This can especially be done with the introduction of a combination of alkali metal formates, such as potassium formate with cesium formate. As an example, an aqueous-based portion of the drilling fluid can contain cesium formate which can range from about 1.8 to about 2.4 s.g. This density range can be adjusted with the introduction of potassium formate. For instance, when 0 to 100% by weight of potassium formate is included in the aqueous-based portion of the drilling fluid, the density of the overall aqueous-based portion of the drilling fluid can range from about 1.2 to about 2.4. Thus, the density of the drilling fluid can essentially be "dialed-in" to meet the density needed for the drilling fluid to be used in the drilling of the well bore at the appropriate depths. For lower density ranges, sodium formate can be added to the potassium formate, hence, "dialing-in" lower density drilling fluids.

Thus, the drilling fluids of the present invention make it possible to achieve a variety of different densities and to minimize or completely eliminate the solid weighting material that is present in conventional drilling fluids.

The drilling fluids of the present invention can be introduced into the well bore by any conventional technique such as, but not limited to, being pumped into the drill pipe. Further, the drilling fluids can be recovered using conventional techniques.

The drilling fluids of the present invention can be prepared by mixing all of the components together. When an emulsion is prepared, typically, the components will be mixed together such as by shearing in order to ensure a dispersion that is preferably uniform with respect to the components.

For example, a typical paraffinic hydrocarbon oil such as ESCAID 110, having a density of 0.803 s.g. (6.7 ppg) and a cesium formate solution having a density of 2.2 s.g. (18.36 ppg) when combined in a ratio of 1:1 and by addition of an emulsifier or a series of emulsifiers admixed by shearing, the fluids together can produce an emulsion or microemulsion that has a cesium formate invert phase or (internal phase) and an oil external phase. The density of the combined mixture of this example is 1.51 s.g. (12.6 ppg).

For purposes of the present invention, when a hydrocarbon-based external fluid is used with at least one formate fluid as described above, the formate fluids can be partially or totally emulsified into the hydrocarbon-based fluid. Or, in the alternative, when a majority of the drilling fluid is a formate fluid, the hydrocarbon-based fluid, if present, can be partially or totally emulsified into the formate fluid.

Optionally, the drilling fluids of the present invention can also contain at least one acid. Preferably, the acid is an acid containing at least one carboxylic group and more preferably is formic acid or an acid derivative thereof. Other examples of acids that can be used include, but are not limited to, acetic acid, ascorbic acid, citric acid, tartaric acid, phthalic acid, glycolic acid, and combinations thereof. The acid can be present in various amounts such as from about 1% or less to 25 weight % or more based on the weight of the drilling fluid. The presence of the acid has the capability of adjusting the pH of the drilling fluid as well as providing other benefits to the drilling fluid. When an acid is present, for instance, the alkali metal formate fluid, such as cesium formate, can be present in any molar amount, but is preferably present in an amount of about 3 M. Similarly, the acid, when present, can be present in any molar amount, and is preferably present in an amount of from about 2.2 M to about 15 M. The pH of the drilling fluid can be any pH.

The present invention will be further clarified by the following examples, which are intended to be purely exemplary of the present invention.

EXAMPLES

Various drilling fluid formulations were prepared and tested to determine the ability of the drilling fluids to serve as suitable fluids for drilling.

In the Examples, cesium formate was used and as can be seen in the results summarized in the various tables, a drilling fluid was made that had low or zero solids content and had the capability to "dial-in" various densities using a combination of components described herein.

In the examples, a barrel is generally 42 gallons of liquid. IA-35 is a synthetic oil from Integrity Industries. Integrity Synvis is a viscosifier. Witco DTA 350 is a wetting agent. Baroid Baracarb 50 is calcium carbonate. Initial ES (volts) is electrical stability at the temperature shown below the values. Initial properties refers to apparent viscosity using a Fann 35 viscometer. SA refers to static-aged ES testing and 250 refers to testing at 250° F. for 16 hours. "Silv" refers to a Silverson mixer.

The tests in the Tables were conducted in accordance with Recommended Practice Standard Procedure for Field Testing oil-based drilling fluids, API, 13B-2 ($2^{nd}$ Ed., Dec. 1, 1991), and Recommended Practice Standard Procedure API Recommended Procedure 13-I ($5^{th}$ Ed., Jun. 1, 1995), incorporated in their entirety by reference herein.

Cesium formate, IA - 35 (50/50 mixture, 2.3 s.g. CsF) 2.3 sg csf
Mixing Procedure:

| | |
|---|---|
| 1. | Measure out IA - 35 |
| 1A. | Add Synvis, mix 5 minutes |
| 2. | Add CsF, mix 10 min. |
| 3. | Add Emulsifier Synvert, mix 10 minutes |
| 3A. | Add calcium carbonate, mix 10 minutes |
| 4. | Run initial ES, viscosities at 120° F. |
| 5. | Put 10 ml sample in a vial, SA for 24 hrs at 75° F., measure volumes |

-continued

| | |
|---|---|
| 6. | Hot-roll for 16 hours at 150° F. |
| 7. | Remix, run rheology, ES, API, HTHP at 150° F. |
| 8. | Put vials in oven and static-age at 150° F. for 24 hrs, measure volumes |
| 9. | If 150° F. HTHP is good, run at 250° F. |

41.6/58.4 oil/csf ratio

| | Sample # | | | | | |
|---|---|---|---|---|---|---|
| | 337 | | 338 | | 339 | |
| IA - 35, grams | 98.26 | | 98.26 | | 93.26 | |
| Cesium Formate, grams | 445 (2.366) | | 445 (2.366) | | 445 (2.366) | |
| Integrity Emulsifier, lb/bbl | 25 | | 25 | | 20 | |
| Integrity Synvis, lb/bbl | 0.5 | | 1 | | 0.5 | |
| Witco DTA 350, lb/bbl | — | | — | | — | |
| Baroid Baracarb 50, lb/bbl | 50 | | 50 | | 50 | |
| Initial ES, volts | 103 | | 129 | | 167 | |
| Hot-rolled 16 hrs, ES | 166 | | 114 | | 151 | |
| | 114 | | 102 | | 148 | |
| | 140 | | 139 | | 138 | |
| Initial Properties | 120° F. | 150° F. | 120° F. | 150° F. | 120° F. | 150° F. |
| 600 rpm | 162 | 116 | 186 | 118 | 164 | 115 |
| 300 rpm | 93 | 65 | 114 | 67 | 96 | 66 |
| 200 rpm | 67 | 47 | 83 | 49 | 70 | 48 |
| 100 rpm | 40 | 27 | 49 | 29 | 41 | 28 |
| 6 rpm | 8 | 7 | 9 | 6 | 7 | 6 |
| 3 rpm | 6 | 5 | 7 | 5 | 5 | 5 |
| Plastic Viscosity, cP | 69 | 51 | 72 | 51 | 68 | 49 |
| Yield Pt, lb/100 ft^2 | 24 | 14 | 42 | 16 | 28 | 17 |
| Gels, 10 sec/10 min. | 6/7 | 6/6 | 6/7 | 5/6 | 5/6 | 5/5 |
| Settling in thermocup | no | no | no | no | no | no |
| HR 16 hrs at 150° F. | | | | | | |
| 600 rpm | 161 | 113 | 187 | 123 | 162 | 114 |
| 300 rpm | 93 | 64 | 116 | 70 | 97 | 66 |
| 200 rpm | 68 | 46 | 86 | 52 | 72 | 48 |
| 100 rpm | 39 | 27 | 52 | 30 | 473 | 28 |
| 6 rpm | 8 | 6 | 10 | 6 | 7 | 6 |
| 3 rpm | 6 | 5 | 8 | 5 | 5 | 4 |
| Plastic Viscosity, cP | 68 | 49 | 71 | 53 | 65 | 48 |
| Yield Pt, lb/100 ft^2 | 25 | 15 | 45 | 17 | 32 | 18 |
| Gels, 10 sec/10 min. | 6/6 | 5/6 | 7/9 | 5/6 | 6/6 | 5/5 |
| API filt, ml total | 1.0 | | 0.2 | | 0.4 | |
| API filt, ml oil | — | | — | | — | |
| API filt, ml emulsion | 1.0 | | 0.2 | | 0.4 | |
| API filt, ml brine | — | | — | | — | |
| HTHP at 150° F., ml | | | | | 0.2 | |
| HTHP at 250° F., ml | | | | | 11.4 | |
| 250° F. oil | | | | | 0.0 | |

| | -continued | |
|---|---|---|
| 250° F. emulsion | | 6.8 |
| 250° F. brine | | 4.6 |
| Comments | | |

NOTE:
1. Sample 337 and 338 looked grainy with 15 lb/bbl Synvert V. Concentration was increased to 25 lb/bbl.
After hot-rolling at 150° F., #337
and #338 still appear grainy.
2. Mud weight of 339 is 14.7 lb/gal (CsF in 337–339 is 2.366 s.g)

| | 41.6/58.4 oil/csf ratio | | | | | |
|---|---|---|---|---|---|---|
| | Sample # | | | | | |
| | 340 | | 347 | | 348 | |
| IA - 35, grams | 93.26 | | 88.26 | | 88.26 | |
| Cesium Formate, grams | 455 (2.366) | | 445 (2.3) | | 445 (2.3) | |
| Integrity Emulsifier, lb/bbl | 20 | | 25 | | 25 | |
| Integrity Synvis, lb/bbl | 1 | | — | | — | |
| Witco DTA 350, lb/bbl | — | | 0.5 | | 1 | |
| Baroid Baracarb 50, lb/bbl | 50 | | 50 | | 50 | |
| Initial ES, volts | 117 | 128 | 212 | 192 | 205 | 243 |
| Hot-rolled 16 hrs, ES | 122 | 118 | 148 | 145 | 252 | 247 |
| Initial Properties | 120° F. | 150° F. | 120° F. | 150° F. | 120° F. | 150° F. |
| 600 rpm | 183 | 126 | 177 | 132 | 182 | 132 |
| 300 rpm | 109 | 73 | 106 | 78 | 111 | 80 |
| 200 rpm | 80 | 53 | 77 | 57 | 83 | 61 |
| 100 rpm | 47 | 31 | 46 | 347 | 52 | 38 |
| 6 rpm | 8 | 6 | 8 | 7 | 10 | 8 |
| 3 rpm | 6 | 5 | 6 | 5 | 7 | 6 |
| Plastic Viscosity, cP | 74 | 53 | 71 | 54 | 71 | 52 |
| Yield Pt, lb/100 ft$^2$ | 35 | 20 | 35 | 24 | 40 | 28 |
| Gels, 10 sec/10 min. | 6/7 | 5/5 | 6/6 | 6/6 | 8/8 | 6/7 |
| Settling in thermocup HR 16 hrs at 150° F. | no | no | no | no | no | no |
| 600 rpm | 184 | 129 | 179 | 140 | 184 | 144 |
| 300 rpm | 111 | 75 | 109 | 84 | 113 | 88 |
| 200 rpm | 82 | 55 | 80 | 62 | 85 | 66 |
| 100 rpm | 49 | 32 | 48 | 37 | 52 | 41 |
| 6 rpm | 8 | 6 | 8 | 7 | 10 | 9 |
| 3 rpm | 6 | 5 | 6 | 5 | 8 | 7 |
| Plastic Viscosity, cP | 73 | 56 | 70 | 56 | 71 | 56 |
| Yield Pt, lb/100 ft$^2$ | 38 | 28 | 39 | 32 | 42 | 32 |
| Gels, 10 sec/10 min. | 6/7 | 5/6 | 6/6 | 5/5 | 8/8 | 7/9 |
| API filt, ml total | 0.3 | | 3.5 | | 6.2 | |
| API filt, ml oil | — | | — | | — | |
| API filt, ml emulsion | 0.3 | | 3.5 | | 6.2 | |
| API filt, ml brine | — | | — | | — | |

-continued

| | | | |
|---|---|---|---|
| HTHP at 150° F., ml | 0.2 | 19.4 | (0.8 brine) |
| HTHP at 250° F. ml | 4.4 | | |
| 250° F. oil | 0.0 | | |
| 250° F. emulsion | 3.2 | | |
| 250° F. brine | 1.2 | | |
| Comments | | | |

NOTE
1. Mud weight of 339 is 14.7 lb/gal (CsF in 340 is 2.366 s.g)
2. Mud weight of 347 is 14.6 lb/gal (CsF in 347–348 is 2.30 s.g)

41.6/58.4 oil/csf ratio

| | Sample # | | | | | |
|---|---|---|---|---|---|---|
| | 341 | 342 | 343 | 344 | 345 | 346 |
| IA - 35, grams | 88.26 | 88.26 | 98.26 | 98.26 | 93.26 | 93.26 |
| Cesium Formate, grams | 445 | 445 | 445 | 445 | 445 | 445 |
| Integrity Emulsifier, lb/bbl | 25 | 25 | 15 | 15 | 20 | 20 |
| Integrity Synvis, lb/bbl | 0.5 | 1 | — | — | — | — |
| Witco DTA 350, lb/bbl | — | — | 0.5 | 1 | 0.5 | 1 |
| Baroid Baracarb 50, lb/bbl | 50 | 50 | 50 | 50 | 50 | 50 |

Cesium Formate, Escaid 110 (50/50 mixture)

Mixing Procedure:

1. Measure out Escaid 110, add Organoclay, mix 10 minutes
2. Add emulsifier(s), mix 5 minutes, add Gilsonite, mix 10 minutes
3. Add CsF, mix 10 min on HB, add CaCO3, mix 10 min on HB
4. Run initial ES, viscosities at 120 F.
5. Put 10 ml sample in vial, SA for 24 hrs at 75 F., measure volume
6. Hot Roll for 16 hrs. at 150 F.
7. Remix, run rheology es, HPHT @ 250 F.
8. Put vial in oven SA 24 hrs @ 150 F.

| Sample # | E-1 | E-2 | E-3 | E-4 |
|---|---|---|---|---|
| Integrity Synvert IV, lb/bbl | 10 | 15 | 10 | 10 |
| Dimer-Trimer acid, lb/bbl | 0 | 0 | 0 | 1 |
| Integrity Synvert TWA, lb/bbl | 0 | 0 | 0 | 6 |
| Organoclay, lb/bbl | 0 | 0 | 4 | 4 |
| Gilsonite, lb/bbl | 0 | 0 | 5 | 5 |
| CaCo3, lb/bbl | 0 | 0 | 50 | 50 |
| ES @ 120 F. | 225 | 289 | 170 | 175 |
| Hot-rolled 16 hrs, ES @ 120 F. | 395 | 440 | 365 | 350 |
| Initial Properties | | | | |
| 600 rpm @ 120 F. | 28 | 30 | 85 | 92 |
| 300 rpm @ 120 F. | 15 | 16 | 40 | 50 |
| 200 rpm @ 120 F. | 10 | 11 | 31 | 41 |
| 100 rpm @ 120 F. | 5 | 6 | 15 | 25 |
| 6 rpm @ 120 F. | 0 | 1 | 3 | 6 |
| 3 rpm @ 120 F. | 0 | 0 | 1 | 5 |
| Plastic Viscosity, cP | 13 | 14 | 45 | 42 |
| Yield Point, lb/100 ftsq | 2 | 2 | 5 | 8 |
| Gels, 10 sec/10 min | 0/0 | 0/1 | 1/4 | 5/8 |
| HR 16 hrs @ 150 F. | | | | |
| 600 rpm @ 120 F. | 31 | 33 | 96 | 110 |
| 300 rpm @ 120 F. | 16 | 18 | 49 | 62 |
| 200 rpm @ 120 F. | 10 | 12 | 35 | 53 |
| 100 rpm @ 120 F. | 5 | 6 | 20 | 40 |
| 6 rpm @ 120 F. | 0 | 2 | 4 | 10 |
| 3 rpm @ 120 F. | 0 | 1 | 2 | 6 |
| Plastic Viscosity, cP | 15 | 15 | 47 | 48 |
| Yield Point, lb/100 ftsq | 1 | 3 | 4 | 14 |
| Gels, 10 sec/10 min. | 0/0 | 1/1 | 3/4 | 7/9 |
| HPHT @ 250 F., ml | 30 | 26 | 8 | 6 |
| Water in filtrate, ml | 4 | 3 | 0 | 0 |
| 24 hrs @ 75 F. | | | | |
| Free Oil % | 10 | 8 | 5 | 3 |
| Emulsion % | 90 | 92 | 95 | 97 |
| Free Brine % | 0 | 0 | 0 | 0 |

Cesium Formate, IA-35 (75/25 mixture)

Mixing Procedure:

1. Measure out IA-35, add Organoclay, mix 10 minutes
2. Add emulsifier(s), mix 5 minutes, add Gilsonite, mix 10 minutes
3. Add CsF, mix 10 min on HB, add CaCO3, mix 10 min on HB
4. Run initial ES, viscosities at 120 F.
5. Put 10 ml sample in vial, SA for 24 hrs at 75 F. measure volume
6. Hot Roll for 16 hrs. at 250 F.
7. Remix, run rheology es, HPHT @ 150 F.
8. Put vials in oven SA 24 hrs @ 150 F.

|  | Sample # | | | | |
|---|---|---|---|---|---|
|  | 1 | 2 | 3 | 4 | 5 |
| Integrity Synvert IV, lb/bbl | 10 | 15 | 10 | 10 | 15 |
| Dimer-Trimer acid, lb/bbl | 0 | 0 | 0 | 1 | 1 |
| Integrity Synvert TWA, lb/bbl | 0 | 0 | 0 | 6 | 6 |
| Organoclay, lb/bbl | 0 | 0 | 4 | 4 | 4 |
| Gilsonite, lb/bbl | 0 | 0 | 5 | 5 | 5 |
| CaCo3, lb/bbl | 0 | 0 | 50 | 50 | 50 |
| ES @ 120 F. | 226 | 250 | 270 | 175 | 225 |
| Hot-rolled 16 hrs, ES @ 120 F. | 185 | 200 |  |  |  |
| Initial Properties |  |  |  |  |  |
| 600 rpm @ 120 F. | 251 | 265 | t | t | t |
| 300 rpm @ 120 F. | 169 | 172 | o | o | o |
| 200 rpm @ 120 F. | 135 | 133 | o | o | o |
| 100 rpm @ 120 F. | 92 | 184 |  |  |  |
| 6 rpm @ 120 F. | 26 | 13 | t | t | t |
| 3 rpm @ 120 F. | 20 | 8 | h | h | h |
|  |  |  | i | i | i |
| Plastic Viscosity, cP | 82 | 93 | c | c | c |
| Yield Point, lb/100 ftsq | 87 | 79 | k | k | k |
| Gels, 10 sec/10 min | 24/28 | 8/12 |  |  |  |
| HR 16 hrs @ 150 F. |  |  |  |  |  |
| 600 rpm @ 120 F. | 276 | 259 |  |  |  |
| 300 rpm @ 120 F. | 175 | 166 |  |  |  |
| 200 rpm @ 120 F. | 140 | 101 |  |  |  |
| 100 rpm @ 120 F. | 99 | 22 |  |  |  |
| 6 rpm @ 120 F. | 29 | 14 |  |  |  |
| 3 rpm @ 120 F. | 22 | 8 |  |  |  |
| Plastic Viscosity, cP | 101 | 93 |  |  |  |
| Yield Point, lb/100 ftsq | 74 | 73 |  |  |  |
| Gels, 10 sec/10 min. | 22/23 | 8/12 |  |  |  |
| HPHT @ 250 F., ml | 23 | 16 |  |  |  |
| Water in filtrate, ml | 8 | 4 |  |  |  |
| 24 hrs @ 75 F. |  |  |  |  |  |
| Free Oil % |  | 1 | 0 | 0 |  |
| Emulsion % |  | 99 | 100 | 100 |  |
| Free Brine % |  | 0 | 0 | 0 |  |
| 24 hrs @ 150 F. |  |  |  |  |  |
| Free oil % |  | 2 | 2 | 0 |  |
| Emulsion % |  | 98 | 98 | 100 |  |
| Free Brine % |  | 0 | 0 | 0 |  |

Observational Notes:
Emulsion is clear at temperatures above 130 F.
Amount of shear imparted to system is directly related to emulsion stability
Heating the emulsion to 150 F. acts to stabilize emulsion (similar to shearing)
Oil/Water ratios as low as 25/75 are achievable with this system

Cesium Formate, IA-35 (50/50 mixture)

Mixing Procedure:

1. Measure out IA-35, add Organoclay, mix 10 minutes
2. Add emulsifier(s), mix 5 minutes, add Gilsonite, mix 10 minutes
3. Add CsF, mix 10 min on HB, add CaCO3, mix 10 min on HB
4. Run initial ES, viscosities at 120 F.
5. Put 10 ml sample in vial, SA for 24 hrs at 75 F., measure volume
6. Hot Roll for 16 hrs. at 150 F.
7. Remix, run rheology es, HPHT @ 250 F.
8. Put vials in oven SA 24 hrs @ 150 F.

|  | Sample # | | | | |
|---|---|---|---|---|---|
|  | 1 | 2 | 3 | 4 | 5 |
| Integrity Synvert IV, lb/bbl | 10 | 15 | 10 | 10 | 15 |
| Dimer-Trimer acid, lb/bbl | 0 | 0 | 0 | 1 | 1 |
| Integrity Synvert TWA, lb/bbl | 0 | 0 | 0 | 6 | 6 |
| Organoclay, lb/bbl | 0 | 0 | 4 | 4 | 4 |
| Gilsonite, lb/bbl | 0 | 0 | 5 | 5 | 5 |
| CaCo3, lb/bbl | 0 | 0 | 50 | 50 | 50 |
| ES @ 120 F. | 226 | 255 | 241 | 150 | 231 |
| Hot-rolled 16 hrs, ES @ 120 F. | 425 | 475 | 427 | 320 | 444 |
| Initial Properties |  |  |  |  |  |
| 600 rpm @ 120 F. | 39 | 42 | 162 | 181 | 155 |
| 300 rpm @ 120 F. | 20 | 22 | 93 | 131 | 92 |
| 200 rpm @ 120 F. | 14 | 15 | 66 | 110 | 67 |
| 100 rpm @ 120 F. | 7 | 8 | 36 | 81 | 39 |
| 6 rpm @ 120 F. | 0 | 1 | 3 | 33 | 6 |
| 3 rpm @ 120 F. | 0 | 0 | 2 | 28 | 4 |
| Plastic Viscosity, cP | 19 | 20 | 69 | 50 | 63 |
| Yield Point, lb/100 ftsq | 1 | 2 | 24 | 81 | 29 |
| Gels, 10 sec/10 min | 0/0 | 0/2 | 3/7 | 29/32 | 7/7 |
| HR 16 hrs @ 150 F. |  |  |  |  |  |
| 600 rpm @ 120 F. | 51 | 55 | 169 | 195 | 188 |
| 300 rpm @ 120 F. | 27 | 29 | 101 | 145 | 114 |
| 200 rpm @ 120 F. | 14 | 14 | 75 | 113 | 86 |
| 100 rpm @ 120 F. | 9 | 10 | 43 | 87 | 51 |
| 6 rpm @ 120 F. | 1 | 1 | 4 | 37 | 8 |
| 3 rpm @ 120 F. | 0 | 1 | 2 | 30 | 5 |
| Plastic Viscosity, cP | 24 | 26 | 68 | 50 | 74 |
| Yield Point, lb/100 ftsq | 3 | 3 | 33 | 95 | 40 |
| Gels, 10 sec/10 min. | 0/0 | 0/1 | 3/3 | 33/35 | 5/6 |
| HPHT @ 250 F., ml | 28 | 22 | 15 | 14 | 6 |
| Water in filtrate, ml | 4 | 3 | 2 | 2 | 0 |
| 24 hrs @ 75 F. |  |  |  |  |  |
| Free Oil % | 5 | 10 | 4 | 3 | 2 |
| Emulsion % | 95 | 90 | 96 | 97 | 98 |
| Free Brine % | 0 | 0 | 0 | 0 | 0 |
| 24 hrs @ 150 F. |  |  |  |  |  |
| Free oil % | 18 | 15 | 10 | 0 |  |
| Emulsion % | 92 | 85 | 90 | 94 |  |
| Free Brine % | 0 | 0 | 0 | 0 |  |

| Cesium formate, Escaid 110 (50/50 mixture) |
|---|

175 ml Escaid 110 (0.803 sg) - (140.5 grams)
175 ml Cesium Formate (2.2 sg) - (385 grams)
Mixing Procedure:

1. Measure out Escaid 110, add Geltone II, mix 10 minutes
2. Add emulsifiers (Below in bold), mix 5 minutes, add Barablock, mix 10 minutes
3. Add CsF, mix 10 min. on HB, add Lo-Wate, mix 10 min. on HB
4. Run initial ES, viscosities at 120° F.
5. Put 10 ml sample in a vial, SA for 24 hrs at 75° F., measure volumes
6. Hot-roll for 16 hours at 150° F.
7. Remix, run rheology, ES, API, HTHP at 150° F.
8. Put vials in oven and static-age at 150° F. for 24 hrs, measure volumes
9. If 150° F. HTHP is good, run at 250° F.

|  | Sample # | | | | | |
|---|---|---|---|---|---|---|
|  | 225 | 226 | 227 | 228 | 229 | 230 |
| Integrity Synvert II (Lot# 991512), lb/bbl | 7 | 7 | 7 | 7 | 7 | 7 |
| Witco DTA 350 (dimer-trimer), lb/bbl | 1 | 1 | 1 | 1 | 1 | 1 |
| Integrity Synvert TWA (Jan. 24, 2000, D116), lb/bbl | 2 | 4 | 6 | 2 | 4 | 6 |
| Baroid Geltone II, lb/bbl | — | — | — | 4 | 4 | 4 |
| Baroid Barablock 400, lb/bbl | — | — | — | — | — | — |
| M-I Lo-Wate, lb/bbl | 50 | 50 | 50 | 50 | 50 | 50 |
| Initial ES, volts | 107 | 194 | 247 | 127 | 123 | 128 |
| Hot-rolled 16 hrs, ES | 426 | 450 | 290 | 150 | 185 | 170 |
| Initial Properties | | | | | | |
| 600 rpm at 75° F. | 80 | 67 | 80 | 99 | 74 | 87 |
| 300 rpm | 58 | 48 | 60 | 75 | 52 | 60 |
| 200 rpm | 49 | 40 | 51 | 64 | 43 | 48 |
| 100 rpm | 37 | 31 | 39 | 49 | 31 | 35 |
| 6 rpm | 13 | 10 | 13 | 18 | 12 | 13 |
| 3 rpm | 10 | 5 | 4 | 15 | 10 | 11 |
| Plastic Viscosity, cP | 22 | 19 | 20 | 24 | 22 | 27 |
| Yield Pt, lb/100 ft^2 | 36 | 29 | 40 | 51 | 30 | 33 |
| Gels, 10 sec/10 min. | 11/7 | 5/7 | 7/3 | 15/15 | 10/10 | 10/11 |
| HR 16 hrs at 150° F. | | | | | | |
| 600 rpm at 120° F. | 71 | 89 | 95 | 94 | 75 | 70 |
| 300 rpm | 53 | 69 | 74 | 68 | 52 | 48 |
| 200 rpm | 44 | 59 | 63 | 56 | 43 | 39 |
| 100 rpm | 34 | 45 | 49 | 42 | 31 | 28 |
| 6 rpm | 10 | 12 | 12 | 17 | 12 | 10 |
| 3 rpm | 4 | 5 | 4 | 13 | 10 | 8 |
| Plastic Viscosity, cP | 18 | 20 | 21 | 26 | 23 | 22 |
| Yield Pt, lb/100 ft^2 | 35 | 49 | 53 | 42 | 29 | 26 |
| Gels, 10 sec/10 min. | 7/4 | 9/4 | 10/4 | 12/13 | 10/11 | 9/9 |
| API filtrate, ml | 0.8 | 1.1 | 1.1 | 1.6 | 0.9 | 0.6 |
| API Filtrate, oil | 0 | 0 | 0 | 0 | 0 | 0 |
| API Filtrate, brine | 0 | 0 | 0 | 0 | 0 | 0 |
| HTHP at 150° F., ml | 8.8 | 3.0 | 5.0 | 3.5 | 1.6 | 0.8 |

-continued

| Cesium formate, Escaid 110 (50/50 mixture) | | | | | | |
|---|---|---|---|---|---|---|
| Water in filtrate? HTHP at 250° F., ml | 6.0 | 2.5 | 2.5 | 1.5 | 0.4 | 0.0 |
| | 24.0 | 18.0 | 12.0 | 8.2 | 4.2 | 2.5 |
| Water in filtrate? 24 hrs at 75° F. | 12.0 | 9.0 | 3.1 | 2.6 | 1.7 | 0.6 |
| Total fluid heighth | 34 | 35 | 34 | 35 | 36 | 33 |
| free oil heighth | 6 | 3 | 2 | 1 | 1 | 2 |
| emusion heighth | 28 | 32 | 32 | 34 | 35 | 31 |
| free brine heighth | 0 | 0 | 0 | 0 | 0 | 0 |
| free oil, % | 18% | 9% | 6% | 3% | 3% | 6% |
| emusion, % | 82% | 91% | 94% | 97% | 97% | 94% |
| free brine, % | 0% | 0% | 0% | 0% | 0% | 0% |
| 24 hrs at 150° F. | | | | | | |
| Total fluid heighth | 34 | 36 | 35 | 35 | 37 | 32 |
| free oil heighth | 8 | 8 | 6 | 3 | 3 | 4 |
| emusion heighth | 26 | 28 | 29 | 32 | 34 | 28 |
| free brine heighth | 0 | 0 | 0 | 0 | 0 | 0 |
| free oil, % | 24% | 22% | 17% | 9% | 8% | 13% |
| emusion, % | 76% | 78% | 83% | 91% | 92% | 88% |
| free brine, % | 0% | 0% | 0% | 0% | 0% | 0% |
| Difference (72 hrs/24 hrs at 150° F.) | | | | | | |
| free oil, % | 6% | 14% | 11% | 6% | 5% | 6% |
| emusion, % | −6% | −14% | −11% | −6% | −5% | −6% |
| free brine, % | 0% | 0% | 0% | 0% | 0% | 0% |

| | Sample # | | | | | |
|---|---|---|---|---|---|---|
| | 231 | 232 | 233 | 234 | 235 | 236 |
| Integrity Synvert II (Lot# 991512), lb/bbl | 7 | 7 | 7 | 7 | 7 | 7 |
| Witco DTA 350 (dimer-trimer), lb/bbl | 1 | 1 | 1 | 1 | 1 | 1 |
| Integrity Synvert TWA (Jan. 24, 2000, D116), lb/bbl | 2 | 4 | 6 | 2 | 4 | 6 |
| Baroid Geltone II, lb/bbl | — | — | — | 4 | 4 | 4 |
| Baroid Barablock 400, lb/bbl | 5 | 5 | 5 | 5 | 5 | 5 |
| M-I Lo-Wate, lb/bbl | 50 | 50 | 50 | 50 | 50 | 50 |
| Initial ES, volts | 139 | 263 | 249 | 105 | 133 | 161 |
| Hot-rolled 16 hrs, ES | 402 | 314 | 307 | 144 | 196 | 245 |
| Initial Properties | | | | | | |
| 600 rpm at 75° F. | 81 | 90 | 85 | 86 | 81 | 84 |
| 300 rpm | 63 | 69 | 65 | 62 | 57 | 60 |
| 200 rpm | 52 | 59 | 55 | 50 | 47 | 49 |
| 100 rpm | 40 | 46 | 43 | 37 | 34 | 37 |
| 6 rpm | 17 | 14 | 14 | 12 | 14 | 14 |
| 3 rpm | 12 | 5 | 5 | 10 | 12 | 12 |

-continued

| | Cesium formate, Escaid 110 (50/50 mixture) | | | | | |
|---|---|---|---|---|---|---|
| Plastic Viscosity, cP | 18 | 21 | 20 | 24 | 24 | 24 |
| Yield Pt, lb/100 ft^2 | 45 | 48 | 45 | 38 | 33 | 36 |
| Gels, 10 sec/10 min. | 17/15 | 10/5 | 11/6 | 10/11 | 12/13 | 12/12 |
| HR 16 hrs at 150° F. | | | | | | |
| 600 rpm at 120° F. | 111 | 118 | 122 | 63 | 90 | 110 |
| 300 rpm | 84 | 92 | 96 | 43 | 62 | 76 |
| 200 rpm | 71 | 78 | 83 | 35 | 50 | 62 |
| 100 rpm | 53 | 61 | 65 | 25 | 37 | 45 |
| 6 rpm | 17 | 18 | 21 | 9 | 13 | 16 |
| 3 rpm | 7 | 7 | 7 | 7 | 11 | 14 |
| Plastic Viscosity, cP | 27 | 26 | 26 | 20 | 28 | 34 |
| Yield Pt, lb/100 ft^2 | 57 | 66 | 70 | 23 | 34 | 42 |
| Gels, 10 sec/10 min. | 13/5 | 12/6 | 13/5 | 7/8 | 10/11 | 13/14 |
| API filtrate, ml | 1.2 | 1.2 | 0.3 | 0.2 | 0.2 | 0.0 |
| API Filtrate, oil | 0 | 0 | 0 | 0 | 0 | 0 |
| API Filtrate, brine | 0 | 0 | 0 | 0 | 0 | 0 |
| HTHP at 150° F., ml | 2.6 | 2.0 | 1.4 | 2.0 | trace | trace |
| Water in filtrate? | 0.0 | 0.0 | 0.0 | 0.0 | 0.0 | 0.0 |
| HTHP at 250° F., ml | 9.0 | 8.0 | 6.0 | 7.0 | 5.0 | 4.0 |
| Water in filtrate? | 0.0 | 0.0 | 0.0 | 0.0 | 0.0 | 0.0 |
| 24 hrs at 75° F. | | | | | | |
| Total fluid heighth | 35 | 35 | 35 | 34 | 34 | 34 |
| free oil heighth | 3 | 2 | 3 | 2 | 1 | 1 |
| emusion heighth | 32 | 33 | 32 | 32 | 33 | 33 |
| free brine heighth | 0 | 0 | 0 | 0 | 0 | 0 |
| free oil, % | 9% | 6% | 9% | 6% | 3% | 3% |
| emusion, % | 91% | 94% | 91% | 94% | 97% | 97% |
| free brine, % | 0% | 0% | 0% | 0% | 0% | 0% |
| 24 hrs at 150° F. | | | | | | |
| Total fluid heighth | 35 | 36 | 35 | 34 | 35 | 35 |
| free oil heighth | 7 | 6 | 6 | 6 | 4 | 3 |
| emusion heighth | 28 | 30 | 29 | 28 | 31 | 32 |
| free brine heighth | 0 | 0 | 0 | 0 | 0 | 0 |
| free oil, % | 20% | 17% | 17% | 18% | 11% | 9% |
| emusion, % | 80% | 83% | 83% | 82% | 89% | 91% |
| free brine, % | 0% | 0% | 0% | 0% | 0% | 0% |
| Difference (72 hrs/24 hrs at 150° F.) | | | | | | |
| free oil, % | 11% | 11% | 9% | 12% | 8% | 6% |
| emusion, % | −11% | −11% | −9% | −12% | −8% | −6% |
| free brine, % | 6% | 0% | 0% | 0% | 0% | 0% |

Mixing Order:

1. Measure out IA 35 base oil
2. Add Synvert IV
3. Add cesium formate
4. Mix on HB, Silverson to 135° F.

| | Sample # | | | | |
|---|---|---|---|---|---|
| | 1 | 2 | 3 | 4 | 5 |
| IA-35, % | 90 | 75 | 50 | 25 | 10 |
| Synvert IV, lb/bbl | 20 | 20 | 20 | 20 | 20 |
| 2.2 s.g. Cs Formate, % | 10 | 25 | 50 | 75 | 90 |
| Initial Rheologies | | | | | |
| Mud weight, lb/gal | 7.81 | 9.4 | 11.94 | 14.47 | 17.18 |
| 600 rpm at 120° F. | 7 | 13 | 42 | >300 | too thick to measure |
| 300 rpm | 4 | 7 | 21 | 274 | |
| 200 rpm | 3 | 5 | 14 | 218 | |
| 100 rpm | 2 | 3 | 7 | 149 | |
| 6 rpm | 0.2 | 0.5 | 1 | 38 | |
| 3 rpm | 0.2 | 0.5 | 0.5 | 28 | |
| PV | 3 | 6 | 21 | — | — |
| YP | 1 | 1 | 0 | — | — |
| Gels | .5/.5 | 1/1 | 1/1 | 28/32 | — |
| ES | 373 | 310 | 362 | 328 | 133 |
| Vials 16 hrs at 75° F. | | | | | |
| Total Heighth | 32 | 32 | 32 | 31 | |
| Oil | 18 | 1 | 0 | 0 | |
| Emulsion Formate | 14 | 31 | 32 | 31 | |
| Samples H.R. for 16 hours at 150° F. | | | | | |
| 600 rpm at 120° F. | 6 | 13 | 45 | >300 | too thick to measure |
| 300 rpm | 3 | 7 | 23 | 273 | |
| 200 rpm | 2 | 4 | 16 | 222 | |
| 100 rpm | 1 | 2 | 8 | 158 | |
| 6 rpm | 0 | 0 | 2 | 49 | |
| 3 rpm | 0 | 0 | 2 | 40 | |
| PV | 3 | 6 | 22 | — | — |
| YP | 0 | 1 | 1 | — | — |
| Gels | 1/1 | 0/0 | 2/2 | 38/42 | — |
| ES | 1069 | 211 | 232 | 271 | 115 |
| Vials 7 hrs at 150° F. | | | | | |
| Total Height | 32 | 32 | 32 | 32 | |
| Oil | 22 | 3 | 1 | 0 | |
| Emulsion Formate | 10 | 29 | 31 | 32 | |
| Vials 64 hrs at 200° F. | | | | | |
| Total Height | 105 | 103 | 100 | 100 | 105 |
| Oil | 89 | 66 | 40 | 0 | 0 |
| Emulsion | 8 | 12 | 60 | 100 | 105 |
| Formate | 8 | 25 | 0 | 0 | 0 |
| Vials 64 hrs at 250° F. | | | | | |
| Total Height | 103 | 100 | 100 | 100 | 110 |
| Oil | 95 | 70 | 30 | 32 | 0 |
| Emulsion | 8 | 7 | 65 | 60 | 110 |
| Formate | 0 | 23 | 5 | 8 | 0 |
| Vials 64 hrs at 300° F. | | | | | |
| Total Height | 102 | 105 | 102 | 102 | 104 |
| Oil | 92 | 70 | 42 | 32* | 19* |
| Emulsion | 10 | 10 | 10 | | |
| Formate | 0 | 25 | 50 | 70 | 85 |

*combination oil and emulsion

| Integrity Synvert IV Sample 1 gallon can |
|---|

Test Procedure

1. Mix sample
2. Place aliquots of sample in large test tubes
3. Static-age samples for 24 hours at 200, 250, and 300 F., 300 psi N2
4. Static-age samples for 72 hours at 200, 250, and 300 F., 300 psi N2
5. Measure total heighth, oil, emulsion, and brine

| | 200° F. | 250° F. | 300° F. |
|---|---|---|---|
| 24 hour tests | | | |
| Total heighth, mm | 100 | 99 | 99 |
| Free Oil, mm | 9 | 16 | 30 |
| Emulsion, mm | 84 | 73 | 46 |
| Free Brine, mm | 7 | 10 | 23 |
| % Oil | 9.0% | 16.2% | 30.3% |
| % Emulsion | 84.0% | 73.7% | 46.5% |
| % Brine | 7.0% | 10.1% | 23.2% |
| 72 hour tests | | | |
| Total heighth, mm | 96 | 101 | 97 |
| Free Oil, mm | 5 | 10 | 30 |
| Emulsion, mm | 81 | 71 | 22 |
| Free Brine, mm | 10 | 20 | 45 |

| -continued | | | |
|---|---|---|---|
| Integrity Synvert IV Sample 1 gallon can | | | |
| % Oil | 5.2% | 9.9% | 30.9% |
| % Emulsion | 84.4% | 70.3% | 22.7% |
| % Brine | 10.4% | 19.8% | 46.4% |

Note:
the 24 hr 300° F., and the 72 hour 200 and 250° F. fluids appeared to have two phases in the emulsion portion. One phase is more distinctly oil and the second phase is more distinctly emulsion.

| Sample of 50/50 mix from Integrity (one gallon can) | |
|---|---|
| 600 rpm at 75° F. | 90 |
| 300 rpm | 49 |
| 200 rpm | 34 |
| 100 rpm | 18 |
| 6 rpm | 2 |
| 3 rpm | 1 |
| PV | 41 |
| YP | 8 |
| Gels | 2/2 |
| ES | 457 |

| Integrity Turpene-Formate Sample | | |
|---|---|---|
| | 3 days | 7 days |
| Vials 3 and 7 days at 200° F. | | |
| Total Heighth | 50 | 52 |
| Oil | 20 | 15 |
| Emulsion | 0 | 0 |
| Formate | 30 | 37 |
| Vials 3 and 7 days at 250° F. | | |
| Total Heighth | 54 | 51 |
| Oil | 17 | 15 |
| Emulsion | 0 | 0 |
| Formate | 37 | 36 |
| Vials 3 and 7 days at 300° F. | | |
| Total Heighth | 51 | 50 |
| Oil | 15 | 15 |
| Emulsion | 0 | 0 |
| Formate | 36 | 35 |

| | Sample # | | | | | | |
|---|---|---|---|---|---|---|---|
| | 349 | SA 250 Initial 349.5 | SA 250 Silv. 349.75 | 350 | SA 250 Initial 350.5 | SA 250 Silv. 350.75 | 353 |
| IA - 35, grams | 94.26 | 94.26 | 94.26 | 94.26 | 94.26 | 94.26 | 89.26 |
| Cesium Formate, grams | 445 | 445 | 445 | 445 | 445 | 445 | 445 |
| Integrity Emulsifier, lb/bbl | 20 | 20 | 20 | 20 | 20 | 20 | 25 |
| Integrity Synvis, lb/bbl | 0.5 | 0.5 | 0.5 | 0.5 | 0.5 | 0.5 | 0.5 |
| Witco DTA 350, lb/bbl | — | — | — | 0.5 | 0.5 | 0.5 | — |
| Baroid Barablock, lb/bbl | — | — | — | — | — | — | — |
| M-I Lo Wate, lb/bbl | 50 | 50 | 50 | 50 | 50 | 50 | 50 |
| Initial ES, volts | 227 | | | 256 | | | 301 |
| Hot-rolled 16 hrs, ES | 109 | | | 209 | | | 339 |
| Static-aged ES, volts | | 113 | | | 154 | | |
| Initial Properties | 120° F. | 120° F. | 120° F. | 120° F. | 120° F. | 120° F. | 120° F. |
| 600 rpm | 188 | 147 | — | 179 | 148 | — | 203 |
| 300 rpm | 113 | 90 | — | 108 | 88 | — | 122 |

-continued

| | Integrity Synvert IV Sample 1 gallon can | | | | | | |
|---|---|---|---|---|---|---|---|
| 200 rpm | 83 | 68 | — | 80 | 65 | — | 90 |
| 100 rpm | 49 | 41 | — | 48 | 39 | — | 53 |
| 6 rpm | 8 | 6 | — | 6 | 6 | — | 7 |
| 3 rpm | 5 | 4 | — | 4 | 4 | — | 5 |
| Plastic Viscosity, cP | 75 | 57 | — | 71 | 60 | — | 81 |
| Yield Pt, lb/100 ft^2 | 38 | 33 | — | 37 | 28 | — | 41 |
| Gels, 10 sec/10 min. | 5/6 | 5/6 | — | 4/5 | 4/6 | — | 6/6 |
| Settling in thermocup | no | no | — | no | no | — | no |
| Initial ES, volts | 253 | | | 266 | | | 295 |
| Hot-rolled 16 hrs, ES | 205 | 145 | 331 | 222 | 175 | 330 | 242 |
| HR 16 hrs at 150° F. | 150° F. | 150° F. | 150° F. | 150° F. | 150° F. | 150° F. | 150° F. |
| 600 rpm | 137 | 98 | 121 | 137 | 104 | 121 | 158 |
| 300 rpm | 81 | 58 | 70 | 82 | 60 | 70 | 95 |
| 200 rpm | 60 | 42 | 51 | 61 | 44 | 51 | 70 |
| 100 rpm | 36 | 25 | 30 | 37 | 26 | 30 | 42 |
| 6 rpm | 7 | 4 | 5 | 7 | 5 | 5 | 8 |
| 3 rpm | 5 | 3 | 3 | 5 | 3 | 3 | 6 |
| Plastic Viscosity, cP | 56 | 40 | 51 | 55 | 44 | 51 | 63 |
| Yield Pt, lb/100 ft^2 | 25 | 18 | 19 | 27 | 16 | 19 | 32 |
| Gels, 10 sec/10 min. | 6/6 | 3/3 | 3/4 | 5/5 | 3/4 | 3/4 | 6/6 |
| API filt, ml total | 0.7 | — | — | 0.4 | — | — | 0.3 |
| API filt, ml oil | 0 | — | — | 0 | — | — | 0 |
| API filt, ml emulsion | 0.7 | — | — | 0.4 | — | — | 0.3 |
| API filt, ml brine | 0.0 | — | — | 0.0 | — | — | 0.0 |
| HTHP at 250° F., ml | 3.2 | — | 1.6 | 8.8 | — | 2.0 | 4.8 |
| 250° F. oil | 2.4 | — | — | 6 | — | — | 3.6 |
| 250° F. emulsion | 0.8 | — | 1.6 | 2.8 | — | 2.0 | 1.2 |
| 250° F. brine | — | — | — | — | — | — | — |
| Free Oil, % | | 22% | | | 25% | | |

| | Sample # | | | | |
|---|---|---|---|---|---|
| | SA 250 Initial 353.5 | SA 250 Silv. 353.75 | 354 | SA 250 Initial 354.5 | SA 250 Silv. 354.75 |
| IA - 35, grams | 89.26 | 89.26 | 89.26 | 89.26 | 89.26 |
| Cesium Formate, grams | 445 | 445 | 445 | 445 | 445 |
| Integrity Emulsifier, lb/bbl | 25 | 25 | 25 | 25 | 25 |
| Integrity Synvis, lb/bbl | 0.5 | 0.5 | 0.5 | 0.5 | 0.5 |
| Witco DTA 350, lb/bbl | — | — | 0.5 | 0.5 | 0.5 |
| Baroid Barablock, lb/bbl | — | — | — | — | — |
| M-I Lo Wate, lb/bbl | 50 | 50 | 50 | 50 | 50 |
| Initial ES, volts | | | 384 | | |
| Hot-rolled 16 hrs, ES | | | 306 | | |
| Static-aged ES, volts | 150 | | | 240 | |

-continued

| Integrity Synvert IV Sample 1 gallon can | | | | | |
|---|---|---|---|---|---|
| Initial Properties | 120° F. | 120° F. | 120° F. | 120° F. | 120° F. |
| 600 rpm | 159 | — | 224 | 205 | — |
| 300 rpm | 97 | — | 138 | 125 | — |
| 200 rpm | 73 | — | 103 | 93 | — |
| 100 rpm | 44 | — | 65 | 56 | — |
| 6 rpm | 7 | — | 10 | 9 | — |
| 3 rpm | 5 | — | 7 | 7 | — |
| Plastic Viscosity, cP | 62 | — | 86 | 80 | — |
| Yield Pt, lb/100 ft^2 | 35 | — | 52 | 45 | — |
| Gels, 10 sec/10 min. | 6/7 | — | 7/8 | | — |
| Settling in thermocup | no | — | no | no | — |
| Initial ES, volts | | | 387 | | |
| Hot-rolled 16 hrs, ES | 161 | 369 | 314 | 218 | 336 |
| HR 16 hrs at 150° F. | 150° F. | 150° F. | 150° F. | 150° F. | 150° F. |
| 600 rpm | 114 | 136 | 167 | 133 | 157 |
| 300 rpm | 68 | 80 | 102 | 78 | 94 |
| 200 rpm | 50 | 59 | 76 | 57 | 69 |
| 100 rpm | 30 | 35 | 47 | 34 | 41 |
| 6 rpm | 5 | 7 | 10 | 6 | 6 |
| 3 rpm | 4 | 5 | 8 | 4 | 4 |
| Plastic Viscosity, cP | 46 | 56 | 65 | 55 | 63 |
| Yield Pt, lb/100 ft^2 | 22 | 24 | 37 | 23 | 31 |
| Gels, 10 sec/10 min. | 4/5 | 5/6 | 8/8 | 5/5 | 5/5 |
| API filt, ml total | — | — | 1.8 | — | — |
| API filt, ml oil | — | — | 0.1 | — | — |
| API filt, ml emulsion | — | — | 1.7 | — | — |
| API filt, ml brine | — | — | 0.0 | — | — |
| HTHP at 250° F., ml | — | 2.4 | 3.6 | — | 4.8 |
| 250° F. oil | — | — | 0.4 | — | 0.3 |
| 250° F. emulsion | — | 1.0 | 3.2 | — | 2.5 |
| 250° F. brine | — | 1.4 | — | — | 2.0 |
| Free Oil, % | | 25% | | | 25% |

| | Sample # | | |
|---|---|---|---|
| | 351 | 355 | 359 |
| IA - 35, grams | 94.26 | 89.26 | 84.26 |
| Cesium Formate, grams | 445 (2.3) | 445 (2.3) | 445 (2.3) |
| Integrity Emulsifier, lb/bbl | 20 | 25 | 30 |
| Integrity Synvis, lb/bbl | 0.5 | 0.5 | 0.5 |
| Witco DTA 350, lb/bbl | 0.5 | 0.5 | 0.5 |
| Baroid Barablock, lb/bbl | 10 | 10 | 10 |
| M-I Lo Wate, lb/bbl | 50 | 50 | 50 |
| Initial ES, volts | 301   300 | 357   365 | 440   492 |

-continued

| Integrity Synvert IV Sample 1 gallon can | | | | | | |
|---|---|---|---|---|---|---|
| Hot-rolled 16 hrs, ES | 308 | 348 | 328 | 325 | 368 | 389 |
| Initial Properties | 120° F. | 150° F. | 120° F. | 150° F. | 120° F. | 150° F. |
| 600 rpm | 195 | 193 | 241 | 227 | 300+ | 300+ |
| 300 rpm | 117 | 120 | 147 | 143 | 253 | 233 |
| 200 rpm | 87 | 91 | 111 | 110 | 196 | 182 |
| 100 rpm | 53 | 56 | 70 | 70 | 127 | 119 |
| 6 rpm | 7 | 10 | 12 | 15 | 28 | 29 |
| 3 rpm | 5 | 7 | 8 | 11 | 20 | 22 |
| Plastic Viscosity, cP | 78 | 73 | 94 | 84 | — | — |
| Yield Pt, lb/100 ft^2 | 39 | 47 | 53 | 59 | — | — |
| Gels, 10 sec/10 min. | 5/6 | 8/9 | 8/10 | 11/14 | 19/22 | 22/26 |
| Settling in thermocup | no | no | 1 | 2 | 9 | 10 |
| HR 16 hrs at 150° F. | | | | | | |
| 600 rpm | 300+ | 226 | 300+ | 274 | 300+ | 300+ |
| 300 rpm | 201 | 140 | 246 | 171 | 300+ | 242 |
| 200 rpm | 154 | 106 | 188 | 129 | 282 | 186 |
| 100 rpm | 98 | 67 | 119 | 81 | 181 | 121 |
| 6 rpm | 20 | 15 | 25 | 19 | 42 | 32 |
| 3 rpm | 15 | 11 | 19 | 15 | 32 | 26 |
| Plastic Viscosity, cP | — | 86 | — | 103 | — | — |
| Yield Pt, lb/100 ft^2 | — | 54 | — | 68 | — | — |
| Gels, 10 sec/10 min. | 14/19 | 11/12 | 18/22 | 14/15 | 32/33 | 25/27 |
| API filt, ml total | | 0 | | 0.0 | | 0.0 |
| API filt, ml oil | | — | | 0.0 | | 0.0 |
| API filt, ml emulsion | | 0 | | 0.0 | | 0.0 |
| API filt, ml brine | | — | | 0.0 | | 0.0 |
| HTHP at 150° F., ml | | | | | | |
| HTHP at 250° F., ml | | trace | | 1.2 | | trace |
| 250° F. oil | | | | 0.0 | | 0.0 |
| 250° F. emulsion | | | | 1.2 | | trace |
| 250° F. brine | | | | 0.0 | | 0.0 |

| Cesium formate, IA - 35 (42/58 mixture, 2.3 s.g. CsF) 2.3 sg csf |
|---|

Mixing Procedure:

1. Measure out IA - 35
2. Add Synvis, mix 5 minutes
3. Add CsF, mix 10 min.
4. Add Synvert 5, mix 10 minutes
5. Add DTA 350, mix on Silverson to 120° F.
6. Add calcium carbonate, mix 10 minutes on HB
7. Run initial ES, viscosities at 120° F.
8. Put 10 ml sample in a vial, SA for 24 hrs at 75° F., measure
9. Hot-roll for 16 hours at 150° F.
10. Remix, run rheology, ES, API, HTHP at 150° F.
11. Put vials in oven and static-age at 150° F. for 24 hrs, measure
12. If 150° F. HTHP is good, run at 250° F.

-continued

| | Cesium formate, IA - 35 (42/58 mixture, 2.3 s.g. CsF) 2.3 sg csf | | | | | | | |
|---|---|---|---|---|---|---|---|---|
| | Sample # | | | | | | | |
| | 349 | | 350 | | 351 | | 352 | |
| IA - 35, grams | 94.26 | | 94.26 | | 94.26 | | 94.26 | |
| Cesium Formate, grams | 445 (2.3) | | 445 (2.3) | | 445 (2.3) | | 445 (2.3) | |
| Integrity Emulsifier, lb/bbl | 20 | | 20 | | 20 | | 20 | |
| Integrity Synvis, lb/bbl | 0.5 | | 0.5 | | 0.5 | | 0.5 | |
| Witco DTA 350, lb/bbl | — | | 0.5 | | 0.5 | | 1.0 | |
| Baroid Barablock, lb/bbl | — | | — | | 10 | | — | |
| M-I Lo Wate, lb/bbl | 50 | | 50 | | 50 | | 50 | |
| Initial ES, volts | 227 | 253 | 256 | 266 | 301 | 300 | 283 | 365 |
| Hot-rolled 16 hrs, ES | 109 | 205 | 209 | 222 | 308 | 348 | 262 | 276 |
| Initial Properties | 120° F. | 150° F. | 120° F. | 150° F. | 120° F. | 150° F. | 120° F. | 150° F. |
| 600 rpm | 188 | 138 | 179 | 134 | 195 | 193 | 179 | 146 |
| 300 rpm | 113 | 81 | 108 | 80 | 117 | 120 | 112 | 92 |
| 200 rpm | 83 | 59 | 80 | 59 | 87 | 91 | 84 | 70 |
| 100 rpm | 49 | 35 | 48 | 35 | 53 | 56 | 53 | 43 |
| 6 rpm | 8 | 6 | 6 | 5 | 7 | 10 | 7 | 6 |
| 3 rpm | 5 | 5 | 4 | 4 | 5 | 7 | 4 | 4 |
| Plastic Viscosity, cP | 75 | 57 | 71 | 54 | 78 | 73 | 67 | 54 |
| Yield Pt, lb/100 ft^2 | 38 | 24 | 37 | 26 | 39 | 47 | 45 | 38 |
| Gels, 10 sec/10 min. | 5/6 | 5/5 | 4/5 | 4/5 | 5/6 | 8/9 | 4/5 | 5/5 |
| Settling in thermocup | no | no | no | no | no | no | no | no |
| HR 16 hrs at 150° F. | | | | | | | | |
| 600 rpm | 187 | 137 | 196 | 137 | 300+ | 226 | 189 | 143 |
| 300 rpm | 114 | 81 | 120 | 82 | 201 | 140 | 119 | 90 |
| 200 rpm | 85 | 60 | 90 | 61 | 154 | 106 | 91 | 69 |
| 100 rpm | 52 | 36 | 56 | 37 | 98 | 67 | 60 | 44 |
| 6 rpm | 9 | 7 | 9 | 7 | 20 | 15 | 12 | 9 |
| 3 rpm | 7 | 5 | 7 | 5 | 15 | 11 | 8 | 6 |
| Plastic Viscosity, cP | 73 | 56 | 76 | 55 | — | 86 | 70 | 53 |
| Yield Pt, lb/100 ft^2 | 41 | 25 | 44 | 27 | — | 54 | 49 | 37 |
| Gels, 10 sec/10 min. | 7/7 | 6/6 | 6/8 | 5/5 | 14/19 | 11/12 | 8/10 | 6/7 |
| API filt, ml total | 0.7 | | 0.4 | | 0 | | 1.2 | |
| API filt, ml oil | — | | — | | — | | 0.1 | |
| API filt, ml emulsion | 0.7 | | 0.4 | | 0 | | 1.1 | |
| API filt, ml brine | — | | — | | — | | — | |
| HTHP at 150° F., ml | — | | — | | | | | |
| HTHP at 250° F., ml | 3.2 | | 8.8 | | trace | | 3.6 | |
| 250° F. oil | 2.4 | | 6.0 | | | | 2.8 | |
| 250° F. emulsion | 0.8 | | 2.8 | | | | 0.8 | |
| 250° F. brine | 0.0 | | 0.0 | | | | 0.0 | |
| Comments | | | | | | | | |

-continued

| Cesium formate, IA - 35 (42/58 mixture, 2.3 s.g. CsF) 2.3 sg csf | | | | |
|---|---|---|---|---|
| 24 hrs at 75° F. | | | | |
| Total fluid heighth | 38 | 38 | 38 | 38 |
| free oil heighth | 0 | 0 | 0 | 0 |
| emusion heighth | 38 | 38 | 38 | 38 |
| free brine heighth | 0 | 0 | 0 | 0 |
| free oil, % | 0 | 0 | 0 | 0 |
| emusion, % | 100% | 100% | 100% | 100% |
| free brine, % | 0 | 0 | 0 | 0 |
| 24 hrs at 150° F. | | | | |
| Total fluid heighth | 38 | 38 | 38 | 38 |
| free oil heighth | 0 | 0 | 0 | 0 |
| emusion heighth | 38 | 38 | 38 | 38 |
| free brine heighth | 0 | 0 | 0 | 0 |
| free oil, % | 0 | 0 | 0 | 0 |
| emusion, % | 100% | 100% | 100% | 100% |
| free brine, % | 0 | 0 | 0 | 0 |

| | Sample # | | | | | | | |
|---|---|---|---|---|---|---|---|---|
| | 355 | | 356 | | 357 | | 358 | |
| IA - 35, grams | 89.26 | | 89.26 | | 84.26 | | 84.26 | |
| Cesium Formate, grams | 445 (2.3) | | 445 (2.3) | | 445 (2.3) | | 445 (2.3) | |
| Integrity Emulsifier, lb/bbl | 25 | | 25 | | 30 | | 30 | |
| Integrity Synvis, lb/bbl | 0.5 | | 0.5 | | 0.5 | | 0.5 | |
| Witco DTA 350, lb/bbl | 0.5 | | 1.0 | | — | | 0.5 | |
| Baroid Barablock, lb/bbl | 10 | | — | | — | | — | |
| M-I Lo Wate, lb/bbl | 50 | | 50 | | 50 | | 50 | |
| Initial ES, volts | 357 | 365 | 329 | 311 | 335 | 316 | 344 | 321 |
| Hot-rolled 16 hrs, ES | 328 | 325 | 307 | 307 | 298 | 301 | 301 | 272 |
| Initial Properties | 120° F. | 150° F. | 120° F. | 150° F. | 120° F. | 150° F. | 120° F. | 150° F. |
| 600 rpm | 241 | 227 | 196 | 154 | 235 | 182 | 245 | 190 |
| 300 rpm | 147 | 143 | 121 | 95 | 147 | 110 | 150 | 116 |
| 200 rpm | 111 | 110 | 92 | 72 | 108 | 82 | 113 | 86 |
| 100 rpm | 70 | 70 | 59 | 46 | 67 | 51 | 70 | 53 |
| 6 rpm | 12 | 15 | 11 | 10 | 13 | 11 | 13 | 11 |
| 3 rpm | 8 | 11 | 8 | 7 | 10 | 8 | 9 | 8 |
| Plastic Viscosity, cP | 94 | 84 | 75 | 59 | 88 | 72 | 95 | 74 |
| Yield Ft, lb/100 ft^2 | 53 | 59 | 46 | 36 | 59 | 38 | 55 | 42 |
| Gels, 10 sec/10 min. | 8/10 | 11/14 | 8/9 | 7/8 | 9/10 | 9/9 | 9/10 | 8/9 |
| Settling in thermocup | 1 | 2 | 3 | 4 | 5 | 6 | 7 | 8 |
| HR 16 hrs at 150° F. | | | | | | | | |
| 600 rpm | 300+ | 274 | 201 | 153 | 229 | 174 | 245 | 185 |
| 300 rpm | 246 | 171 | 124 | 94 | 140 | 106 | 151 | 112 |
| 200 rpm | 188 | 129 | 95 | 71 | 105 | 79 | 114 | 84 |
| 100 rpm | 119 | 81 | 60 | 49 | 65 | 49 | 70 | 52 |

-continued

| Cesium formate, IA - 35 (42/58 mixture, 2.3 s.g. CsF) 2.3 sg csf | | | | | | | | |
|---|---|---|---|---|---|---|---|---|
| 6 rpm | 25 | 19 | 12 | 10 | 13 | 12 | 14 | 11 |
| 3 rpm | 19 | 15 | 9 | 8 | 10 | 9 | 10 | 8 |
| Plastic Viscosity, cP | — | 103 | 77 | 59 | 89 | 68 | 94 | 73 |
| Yield Pt, lb/100 ft$^2$ | — | 68 | 47 | 35 | 51 | 38 | 57 | 39 |
| Gels, 10 sec/10 min. | 18/22 | 14/15 | 9/10 | 8/8 | 10/10 | 9/10 | 10/11 | 8/9 |
| API filt, ml total | | 0.0 | | 1.8 | | 0.0 | | 1.0 |
| API filt, ml oil | | 0.0 | | 0.1 | | 0.0 | | trace |
| API filt, ml emulsion | | 0.0 | | 1.7 | | 0.0 | | 1.0 |
| API filt, ml brine | | 0.0 | | 0.0 | | 0.0 | | 0.0 |
| HTHP at 150° F., ml | | | | | | | | |
| HTHP at 250° F., ml | | 1.2 | | 7.4 | | 4.8 | | 4.4 |
| 250° F. oil | | 0.0 | | 0.0 | | 0.0 | | 0.0 |
| 250° F. emulsion | | 1.2 | | 7.4 | | 4.8 | | 4.4 |
| 250° F. brine | | 0.0 | | 0.0 | | 0.0 | | 0.0 |
| Comments | | | | | | | | |
| 24 hrs at 75° F. | | | | | | | | |
| Total fluid heighth | | 38 | | 38 | | 38 | | 38 |
| free oil heighth | | 0 | | 0 | | 0 | | 0 |
| emusion heighth | | 38 | | 38 | | 38 | | 38 |
| free brine heighth | | 0 | | 0 | | 0 | | 0 |
| free oil, % | | 0 | | 0 | | 0 | | 0 |
| emusion, % | | 100% | | 100% | | 100% | | 100% |
| free brine, % | | 0 | | 0 | | 0 | | 0 |
| 24 hrs at 150° F. | | | | | | | | |
| Total fluid heighth | | 38 | | 38 | | 38 | | 38 |
| free oil heighth | | trace of oil | | trace of oil | | trace of oil | | trace of oil |
| emusion heighth | | 38 | | 38 | | 38 | | 38 |
| free brine heighth | | 0 | | 0 | | 0 | | 0 |
| free oil, % | | trace | | trace | | trace | | trace |
| emusion, % | | 100% | | 100% | | 100% | | 100% |
| free brine, % | | 0 | | 0 | | 0 | | 0 |

| | Sample # | | | |
|---|---|---|---|---|
| | 353 | 354 | 359 | 360 |
| IA - 35, grams | 89.26 | 89.26 | 84.26 | 84.26 |
| Cesium Formate, grams | 445 (2.3) | 445 (2.3) | 445 (2.3) | 445 (2.3) |
| Integrity Emulsifier, lb/bbl | 25 | 25 | 30 | 30 |
| Integrity Synvis, lb/bbl | 0.5 | 0.5 | 0.5 | 0.5 |
| Witco DTA 350, lb/bbl | — | 0.5 | 0.5 | 1.0 |
| Baroid Barablock, lb/bbl | — | — | 10 | — |
| M-I Lo Wate, lb/bbl | 50 | 50 | 50 | 50 |
| Initial ES, volts | 301     295 | 384     387 | 440     492 | 457     481 |
| Hot-rolled 16 hrs, ES | 339     242 | 306     314 | 368     389 | 377     366 |

-continued

| | \multicolumn{8}{c}{Cesium formate, IA - 35 (42/58 mixture, 2.3 s.g. CsF) 2.3 sg csf} |
|---|---|---|---|---|---|---|---|---|
| Initial Properties | 120° F. | 150° F. | 120° F. | 150° F. | 120° F. | 150° F. | 120° F. | 150° F. |
| 600 rpm | 203 | 155 | 224 | 171 | 300+ | 300+ | 261 | 219 |
| 300 rpm | 122 | 92 | 138 | 104 | 253 | 233 | 167 | 142 |
| 200 rpm | 90 | 68 | 103 | 77 | 196 | 182 | 129 | 109 |
| 100 rpm | 53 | 41 | 65 | 47 | 127 | 119 | 84 | 70 |
| 6 rpm | 7 | 7 | 10 | 8 | 28 | 29 | 14 | 12 |
| 3 rpm | 5 | 5 | 7 | 7 | 20 | 22 | 9 | 8 |
| Plastic Viscosity, cP | 81 | 63 | 86 | 67 | — | — | 94 | 77 |
| Yield Pt, lb/100 ft^2 | 41 | 29 | 52 | 37 | — | — | 73 | 65 |
| Gels, 10 sec/10 min. | 6/6 | 5/6 | 7/8 | 7/7 | 19/22 | 22/26 | 9/11 | 8/10 |
| Settling in thermocup HR 16 hrs at 150° F. | no | no | no | no | 9 | 10 | 11 | 12 |
| 600 rpm | 212 | 158 | 225 | 167 | 300+ | 300+ | 262 | 192 |
| 300 rpm | 131 | 95 | 140 | 102 | 300+ | 242 | 168 | 123 |
| 200 rpm | 97 | 70 | 105 | 76 | 282 | 186 | 131 | 95 |
| 100 rpm | 60 | 42 | 66 | 47 | 181 | 121 | 86 | 64 |
| 6 rpm | 11 | 8 | 13 | 10 | 42 | 32 | 20 | 14 |
| 3 rpm | 8 | 6 | 10 | 8 | 32 | 26 | 15 | 11 |
| Plastic Viscosity, cP | 81 | 63 | 85 | 65 | — | — | 94 | 69 |
| Yield Pt, lb/100 ft^2 | 50 | 32 | 55 | 37 | — | — | 74 | 54 |
| Gels, 10 sec/10 min. | 8/9 | 6/6 | 10/10 | 8/8 | 32/33 | 25/27 | 14/15 | 10/12 |
| API filt, ml total | | 0.3 | | 1.8 | | 0.0 | | 0.3 |
| API filt, ml oil | | — | | 0.1 | | 0.0 | | trace |
| API filt, ml emulsion | | 0.3 | | 1.7 | | 0.0 | | 0.3 |
| API filt, ml brine | | — | | — | | 0.0 | | 0.0 |
| HTHP at 150° F., ml | | | | | | | | |
| HTHP at 250° F., ml | | 4.8 | | 3.6 | | trace | | 3.6 |
| 250° F. oil | | 3.6 | | 0.4 | | 0.0 | | 0.0 |
| 250° F. emulsion | | 1.2 | | 3.2 | | trace | | 1.6 |
| 250° F. brine | | 0.0 | | 0.0 | | 0.0 | | 2.0 |
| Comments 24 hrs at 75° F. | | | | | | | | |
| Total fluid heighth | | 38 | | 38 | | 38 | | 38 |
| free oil heighth | | 0 | | 0 | | 0 | | 0 |
| emusion heighth | | 38 | | 38 | | 38 | | 38 |
| free brine heighth | | 0 | | 0 | | 0 | | 0 |
| free oil, % | | 0 | | 0 | | 0 | | 0 |
| emusion, % | | 100% | | 100% | | 100% | | 100% |
| free brine, % | | 0 | | 0 | | 0 | | 0 |
| 24 hrs at 150° F. | | | | | | | | |
| Total fluid heighth | | 38 | | 38 | | 38 | | 38 |
| free oil heighth | | 0 | | 0 | | 0 | | 0 |
| emusion heighth | | 38 | | 38 | | 38 | | 38 |
| free brine heighth | | 0 | | 0 | | 0 | | 0 |
| free oil, % | | 0 | | 0 | | 0 | | 0 |

-continued

| Cesium formate, IA - 35 (42/58 mixture, 2.3 s.g. CsF) 2.3 sg csf | | | | |
|---|---|---|---|---|
| emusion, % | 100% | 100% | 100% | 100% |
| free brine, % | 0 | 0 | 0 | 0 |

| | Sample # | | | | | | | |
|---|---|---|---|---|---|---|---|---|
| | 349 | SA 250 Initial 349.5 | SA 250 Silv. 349.75 | 350 | SA 250 Initial 350.5 | SA 250 Silv. 350.75 | 351 | 352 |
| IA - 35, grams | 94.26 | 94.26 | 94.26 | 94.26 | 94.26 | 94.26 | 94.26 | 94.26 |
| Cesium Formate, grams | 445 | 445 | 445 | 445 | 445 | 445 | 445 | 445 |
| Integrity Emulsifier, lb/bbl | 20 | 20 | 20 | 20 | 20 | 20 | 20 | 20 |
| Integrity Synvis, lb/bbl | 0.5 | 0.5 | 0.5 | 0.5 | 0.5 | 0.5 | 0.5 | 0.5 |
| Witco DTA 350, lb/bbl | — | — | — | 0.5 | 0.5 | 0.5 | 0.5 | 1.0 |
| Baroid Barablock, lb/bbl | — | — | — | — | — | — | 10 | — |
| M-I Lo Wate, lb/bbl | 50 | 50 | 50 | 50 | 50 | 50 | 50 | 50 |
| Initial ES, volts | 227 | | | 256 | | | 301 | 283 |
| Hot-rolled 16 hrs, ES | 109 | | | 209 | | | 308 | 262 |
| Static-aged ES, volts | | 113 | | | 154 | | | |
| Initial Properties | 120° F. | 120° F. | 120° F. | 120° F. | 120° F. | 120° F. | 120° F. | 120° F. |
| 600 rpm | 188 | 147 | — | 179 | 148 | — | 195 | 179 |
| 300 rpm | 113 | 90 | — | 108 | 88 | — | 117 | 112 |
| 200 rpm | 83 | 68 | — | 80 | 65 | — | 87 | 84 |
| 100 rpm | 49 | 41 | — | 48 | 39 | — | 53 | 53 |
| 6 rpm | 8 | 6 | — | 6 | 6 | — | 7 | 7 |
| 3 rpm | 5 | 4 | — | 4 | 4 | — | 5 | 4 |
| Plastic Viscosity, cP | 75 | 57 | — | 71 | 60 | — | 78 | 67 |
| Yield Pt, lb/100 ft$^2$ | 38 | 33 | — | 37 | 28 | — | 39 | 45 |
| Gels, 10 sec/10 min. | 5/6 | 5/6 | — | 4/5 | 4/6 | — | 5/6 | 4/5 |
| Settling in thermocup | no | no | — | no | no | — | no | no |
| HR 16 hrs at 150° F. | | | | | | | | |
| 600 rpm | 187 | | | 196 | | | 300+ | 189 |
| 300 rpm | 114 | | | 120 | | | 201 | 119 |
| 200 rpm | 85 | | | 90 | | | 154 | 91 |
| 100 rpm | 52 | | | 56 | | | 98 | 60 |
| 6 rpm | 9 | | | 9 | | | 20 | 12 |
| 3 rpm | 7 | | | 7 | | | 15 | 8 |
| Plastic Viscosity, cP | 73 | | | 76 | | | — | 70 |
| Yield Pt, lb/100 ft$^2$ | 41 | | | 44 | | | — | 49 |
| Gels, 10 sec/10 min. | 7/7 | | | 6/8 | | | 14/19 | 8/10 |
| Comments | | | | | | | | |
| Initial ES, volts | 253 | | | 266 | | | 300 | 365 |
| Hot-rolled 16 hrs, ES | 205 | 145 | 331 | 222 | 175 | 330 | 348 | 276 |
| Initial Properties | 150° F. | | | 150° F. | | | 150° F. | 150° F. |
| 600 rpm | 138 | | | 134 | | | 193 | 146 |
| 300 rpm | 81 | | | 80 | | | 120 | 92 |
| 200 rpm | 59 | | | 59 | | | 91 | 70 |
| 100 rpm | 35 | | | 35 | | | 56 | 43 |
| 6 rpm | 6 | | | 5 | | | 10 | 6 |
| 3 rpm | 5 | | | 4 | | | 7 | 4 |
| Plastic Viscosity, cP | 57 | | | 54 | | | 73 | 54 |

-continued

| Cesium formate, IA - 35 (42/58 mixture, 2.3 s.g. CsF) 2.3 sg csf | | | | | | | | |
|---|---|---|---|---|---|---|---|---|
| Yield Pt, lb/100 ft^2 | 24 | | | 26 | | | 47 | 38 |
| Gels, 10 sec/10 min. | 5/5 | | | 4/5 | | | 8/9 | 5/5 |
| Settling in thermocup | no | | | no | | | no | no |
| HR 16 hrs at 150° F. | 150° F. | SA 250 Initial 150° F. | SA 250 Silv. 150° F. | 150° F. | SA 250 Initial 150° F. | SA 250 Silv. 150° F. | 150° F. | 150° F. |
| 600 rpm | 137 | 98 | 121 | 137 | 104 | 121 | 226 | 143 |
| 300 rpm | 81 | 58 | 70 | 82 | 60 | 70 | 140 | 90 |
| 200 rpm | 60 | 42 | 51 | 61 | 44 | 51 | 106 | 69 |
| 100 rpm | 36 | 25 | 30 | 37 | 26 | 30 | 67 | 44 |
| 6 rpm | 7 | 4 | 5 | 7 | 5 | 5 | 15 | 9 |
| 3 rpm | 5 | 3 | 3 | 5 | 3 | 3 | 11 | 6 |
| Free Oil, % | | | 22% | | | 25% | | |

| | Sample # | | | | | | |
|---|---|---|---|---|---|---|---|
| | 353 | SA 250 Initial 353.5 | SA 250 Silv. 353.75 | 354 | SA 250 Initial 354.5 | SA 250 Silv. 354.75 | 355 |
| IA - 35, grams | 89.26 | 89.26 | 89.26 | 89.26 | 89.26 | 89.26 | 89.26 |
| Cesium Formate, grams | 445 | 445 | 445 | 445 | 445 | 445 | 445 |
| Integrity Emulsifier, lb/bbl | 25 | 25 | 25 | 25 | 25 | 25 | 25 |
| Integrity Synvis, lb/bbl | 0.5 | 0.5 | 0.5 | 0.5 | 0.5 | 0.5 | 0.5 |
| Witco DTA 350, lb/bbl | — | — | — | 0.5 | 0.5 | 0.5 | 0.5 |
| Baroid Barablock, lb/bbl | — | — | — | — | — | — | 10 |
| M-I Lo Wate, lb/bbl | 50 | 50 | 50 | 50 | 50 | 50 | 50 |
| Initial ES, volts | 301 | | | 384 | | | 357 |
| Hot-rolled 16 hrs, ES | 339 | | | 306 | | | 328 |
| Static-aged ES, volts | | 150 | | | 240 | | |
| Initial Properties | 120° F. | 120° F. | 120° F. | 120° F. | 120° F. | 120° F. | 120° F. |
| 600 rpm | 203 | 159 | — | 224 | 205 | — | 241 |
| 300 rpm | 122 | 97 | — | 138 | 125 | — | 147 |
| 200 rpm | 90 | 73 | — | 103 | 93 | — | 111 |
| 100 rpm | 53 | 44 | — | 65 | 56 | — | 70 |
| 6 rpm | 7 | 7 | — | 10 | 9 | — | 12 |
| 3 rpm | 5 | 5 | — | 7 | 7 | — | 8 |
| Plastic Viscosity, cP | 81 | 62 | — | 86 | 80 | — | 94 |
| Yield Pt, lb/100 ft^2 | 41 | 35 | — | 52 | 45 | — | 53 |
| Gels, 10 sec/10 min. | 6/6 | 6/7 | — | 7/8 | | — | 8/10 |
| Settling in thermocup | no | no | — | no | no | — | 1 |
| HR 16 hrs at 150° F. | | | | | | | |
| 600 rpm | 212 | | | 225 | | | 300+ |
| 300 rpm | 131 | | | 140 | | | 246 |
| 200 rpm | 97 | | | 105 | | | 188 |
| 100 rpm | 60 | | | 66 | | | 119 |
| 6 rpm | 11 | | | 13 | | | 25 |
| 3 rpm | 8 | | | 10 | | | 19 |
| Plastic Viscosity, cP | 81 | | | 85 | | | — |
| Yield Pt, lb/100 ft^2 | 50 | | | 55 | | | — |

-continued

| Cesium formate, IA - 35 (42/58 mixture, 2.3 s.g. CsF) 2.3 sg csf | | | | | | | |
|---|---|---|---|---|---|---|---|
| Gels, 10 sec/10 min. | 8/9 | | | 10/10 | | | 18/22 |
| Comments | | | | | | | |
| Initial ES, volts | 295 | | | 387 | | | 365 |
| Hot-rolled 16 hrs, ES | 242 | 161 | 369 | 314 | 218 | 336 | 325 |
| Initial Properties | 150° F. | | | 150° F. | | | 150° F. |
| 600 rpm | 155 | | | 171 | | | 227 |
| 300 rpm | 92 | | | 104 | | | 143 |
| 200 rpm | 68 | | | 77 | | | 110 |
| 100 rpm | 41 | | | 47 | | | 70 |
| 6 rpm | 7 | | | 8 | | | 15 |
| 3 rpm | 5 | | | 7 | | | 11 |
| Plastic Viscosity, cP | 63 | | | 67 | | | 84 |
| Yield Pt, lb/100 ft^2 | 29 | | | 37 | | | 59 |
| Gels, 10 sec/10 min. | 5/6 | | | 7/7 | | | 11/14 |
| Settling in thermocup | no | | | no | | | no |
| HR 16 hrs at 150° F. | 150° F. | SA 250 Initial 150° F. | SA 250 Silv. 150° F. | 150° F. | SA 250 Initial 150° F. | SA 250 Silv. 150° F. | 150° F. |
| 600 rpm | 158 | 114 | 136 | 167 | 133 | 157 | 274 |
| 300 rpm | 95 | 68 | 80 | 102 | 78 | 94 | 171 |
| 200 rpm | 70 | 50 | 59 | 76 | 57 | 69 | 129 |
| 100 rpm | 42 | 30 | 35 | 47 | 34 | 41 | 81 |
| 6 rpm | 8 | 5 | 7 | 10 | 6 | 6 | 19 |
| 3 rpm | 6 | 4 | 5 | 8 | 4 | 4 | 15 |
| Free Oil, % | | | 25% | | | 25% | |

| | Sample # | | | | |
|---|---|---|---|---|---|
| | 356 | 357 | 358 | 359 | 360 |
| IA - 35, grams | 89.26 | 84.26 | 84.26 | 84.26 | 84.26 |
| Cesium Formate, grams | 445 | 445 | 445 | 445 | 445 |
| Integrity Emulsifier, lb/bbl | 25 | 30 | 30 | 30 | 30 |
| Integrity Synvis, lb/bbl | 0.5 | 0.5 | 0.5 | 0.5 | 0.5 |
| Witco DTA 350, lb/bbl | 1.0 | — | 0.5 | 0.5 | 1.0 |
| Baroid Barablock, lb/bbl | — | — | — | 10 | — |
| M-I Lo Wate, lb/bbl | 50 | 50 | 50 | 50 | 50 |
| Initial ES, volts | 329 | 335 | 344 | 440 | 457 |
| Hot-rolled 16 hrs, ES | 307 | 298 | 301 | 368 | 377 |
| Static-aged ES, volts | | | | | |
| Initial Properties | 120° F. | 120° F. | 120° F. | 120° F. | 120° F. |
| 600 rpm | 196 | 235 | 245 | 300+ | 261 |
| 300 rpm | 121 | 147 | 150 | 253 | 167 |
| 200 rpm | 92 | 108 | 113 | 196 | 129 |
| 100 rpm | 59 | 67 | 70 | 127 | 84 |
| 6 rpm | 11 | 13 | 13 | 28 | 14 |
| 3 rpm | 8 | 10 | 9 | 20 | 9 |
| Plastic Viscosity, cP | 75 | 88 | 95 | — | 94 |
| Yield Pt, lb/100 ft^2 | 46 | 59 | 55 | — | 73 |
| Gels, 10 sec/10 min. | 8/9 | 9/10 | 9/10 | 19/22 | 9/11 |
| Settling in thermocup | 3 | 5 | 7 | 9 | 11 |

-continued

| Cesium formate, IA - 35 (42/58 mixture, 2.3 s.g. CsF) 2.3 sg csf | | | | | |
|---|---|---|---|---|---|
| HR 16 hrs at 150° F. | | | | | |
| 600 rpm | 201 | 229 | 245 | 300+ | 262 |
| 300 rpm | 124 | 140 | 151 | 300+ | 168 |
| 200 rpm | 95 | 105 | 114 | 282 | 131 |
| 100 rpm | 60 | 65 | 70 | 181 | 86 |
| 6 rpm | 12 | 13 | 14 | 42 | 20 |
| 3 rpm | 9 | 10 | 10 | 32 | 15 |
| Plastic Viscosity, cP | 77 | 89 | 94 | — | 94 |
| Yield Pt, lb/100 ft^2 | 47 | 51 | 57 | — | 74 |
| Gels, 10 sec/10 min. | 9/10 | 10/10 | 10/11 | 32/33 | 14/15 |
| Comments | | | | | |
| Initial ES, volts | 311 | 316 | 321 | 492 | 481 |
| Hot-rolled 16 hrs, ES | 307 | 301 | 272 | 389 | 366 |
| Initial Properties | 150° F. | 150° F. | 150° F. | 150° F. | 150° F. |
| 600 rpm | 154 | 182 | 190 | 300+ | 219 |
| 300 rpm | 95 | 110 | 116 | 233 | 142 |
| 200 rpm | 72 | 82 | 86 | 182 | 109 |
| 100 rpm | 46 | 51 | 53 | 119 | 70 |
| 6 rpm | 10 | 11 | 11 | 29 | 12 |
| 3 rpm | 7 | 8 | 8 | 22 | 8 |
| Plastic Viscosity, cP | 59 | 72 | 74 | — | 77 |
| Yield Pt, lb/100 ft^2 | 36 | 38 | 42 | — | 65 |
| Gels, 10 sec/10 min. | 7/8 | 9/9 | 8/9 | 22/26 | 8/10 |
| Settling in thermocup | no | no | no | no | no |
| HR 16 hrs at 150° F. | | | | | |
| 600 rpm | 153 | 174 | 185 | 300+ | 192 |
| 300 rpm | 94 | 106 | 112 | 242 | 123 |
| 200 rpm | 71 | 79 | 84 | 186 | 95 |
| 100 rpm | 49 | 49 | 52 | 121 | 64 |
| 6 rpm | 10 | 12 | 11 | 32 | 14 |
| 3 rpm | 8 | 9 | 8 | 26 | 11 |
| Free Oil, % | | | | | |

| Cesium formate, IA - 35 (50/50 mixture, 2.3 s.g. CsF) | |
|---|---|
| Mixing Procedure: 2.3 sg csf | |
| 1. | Measure out IA - 35 |
| 1A. | Add Synvis, mix 5 minutes |
| 2. | Add CsF, mix 10 min. |
| 3. | Add Synvert 5, mix 10 minutes |
| 3A. | Add calcium carbonate, mix 10 minutes |
| 4. | Run initial ES, viscosities at 120° F. |
| 5. | Put 10 ml sample in a vial, SA for 24 hrs at 75° F., measure volumes |
| 6. | Hot-roll for 16 hours at 150° F. |
| 7. | Remix, run rheology, ES, API, HTHP at 150° F. |
| 8. | Put vials in oven and static-age at 150° F. for 24 hrs, measure volumes |
| 9. | If 150° F. HTHP is good, run at 250° F. |

| | 41.6/58.4 oil/csf ratio | | | |
|---|---|---|---|---|
| | Sample # | | | |
| | 337 | 338 | 339 | 340 |
| IA - 35, grams | 98.26 | 98.26 | 93.26 | 93.26 |
| Cesium | 445 | 445 | 445 | 445 |

-continued

Cesium formate, IA - 35 (50/50 mixture, 2.3 s.g. CsF)

| | | | | | | | | |
|---|---|---|---|---|---|---|---|---|
| Formate, grams | (2.366) | | (2.366) | | (2.366) | | (2.366) | |
| Integrity Emulsifier, lb/bbl | 25 | | 25 | | 20 | | 20 | |
| Integrity Synvis, lb/bbl | 0.5 | | 1 | | 0.5 | | 1 | |
| Witco DTA 350, lb/bbl | — | | — | | — | | — | |
| Baroid Baracarb 50, lb/bbl | 50 | | 50 | | 50 | | 50 | |
| Initial ES, volts | 103 | 129 | 167 | 166 | 114 | 151 | 117 | 128 |
| Hot-rolled 16 hrs, ES | 114 | 102 | 148 | 140 | 139 | 138 | 122 | 118 |
| Initial Properties | 120° F. | 150° F. | 120° F. | 150° F. | 120° F. | 150° F. | 120° F. | 150° F. |
| 600 rpm | 162 | 116 | 186 | 118 | 164 | 115 | 183 | 126 |
| 300 rpm | 93 | 65 | 114 | 67 | 96 | 66 | 109 | 73 |
| 200 rpm | 67 | 47 | 83 | 49 | 70 | 48 | 80 | 53 |
| 100 rpm | 40 | 27 | 49 | 29 | 41 | 28 | 47 | 31 |
| 6 rpm | 8 | 7 | 9 | 6 | 7 | 6 | 8 | 6 |
| 3 rpm | 6 | 5 | 7 | 5 | 5 | 5 | 6 | 5 |
| Plastic Viscosity, cP | 69 | 51 | 72 | 51 | 68 | 49 | 74 | 53 |
| Yield Pt, lb/100 ft^2 | 24 | 14 | 42 | 16 | 28 | 17 | 35 | 20 |
| Gels, 10 sec/10 min. | 6/7 | 6/6 | 6/7 | 5/6 | 5/6 | 5/5 | 6/7 | 5/5 |
| Settling in thermocup | no | no | no | no | no | no | no | no |
| HR 16 hrs at 150° F. | | | | | | | | |
| 600 rpm | 161 | 113 | 187 | 123 | 162 | 114 | 184 | 129 |
| 300 rpm | 93 | 64 | 116 | 70 | 97 | 66 | 111 | 75 |
| 200 rpm | 68 | 46 | 86 | 52 | 72 | 48 | 82 | 55 |
| 100 rpm | 39 | 27 | 52 | 30 | 473 | 28 | 49 | 32 |
| 6 rpm | 8 | 6 | 10 | 6 | 7 | 6 | 8 | 6 |
| 3 rpm | 6 | 5 | 8 | 5 | 5 | 4 | 6 | 5 |
| Plastic Viscosity, cP | 68 | 49 | 71 | 53 | 65 | 48 | 73 | 56 |
| Yield Pt, lb/100 ft^2 | 25 | 15 | 45 | 17 | 32 | 18 | 38 | 28 |
| Gels, 10 sec/10 min. | 6/6 | 5/6 | 7/9 | 5/6 | 6/6 | 5/5 | 6/7 | 5/6 |
| API filt, ml total | | 1.0 | | 0.2 | | 0.4 | | 0.3 |
| API filt, ml oil | | — | | — | | — | | — |
| API filt, ml emulsion | | 1.0 | | 0.2 | | 0.4 | | 0.3 |
| API filt, ml brine | | — | | — | | — | | — |
| HTHP at 150° F., ml | | | | | | 0.2 | | 0.2 |
| HTHP at 250° F., ml | | | | | | 11.4 | | 4.4 |
| 250° F. oil | | | | | | 0.0 | | 0.0 |
| 250° F. emulsion | | | | | | 6.8 | | 3.2 |
| 250° F. brine | | | | | | 4.6 | | 1.2 |
| Comments | | | | | | | | |

41.6/58.4 oil/csf ratio

| Sample # | 347 | 348 | 341 | 342 | 343 | 344 | 345 | 346 |
|---|---|---|---|---|---|---|---|---|
| IA - 35, grams | 88.26 | 88.26 | 88.26 | 88.26 | 98.26 | 98.26 | 93.26 | 93.26 |
| Cesium Formate, grams | 445 (2.3) | 445 (2.3) | 445 | 445 | 445 | 445 | 445 | 445 |

-continued

| | Cesium formate, IA - 35 (50/50 mixture, 2.3 s.g. CsF) | | | | | | | | |
|---|---|---|---|---|---|---|---|---|---|
| Integrity Emulsifier, lb/bbl | 25 | | 25 | | 25 | 25 | 15 | 15 | 20 | 20 |
| Integrity Synvis, lb/bbl | — | | — | | 0.5 | 1 | — | — | — | — |
| Witco DTA 350, lb/bbl | 0.5 | | 1 | | — | — | 0.5 | 1 | 0.5 | 1 |
| Baroid Baracarb 50, lb/bbl | 50 | | 50 | | 50 | 50 | 50 | 50 | 50 | 50 |
| Initial ES, volts | 212 | | 192 | | 205 | 243 | | | | |
| Hot-rolled 16 hrs, ES | 148 | | 145 | | 252 | 247 | | | | |
| Initial Properties | 120° F. | | 150° F. | | 120° F. | 150° F. | | | | |
| 600 rpm | 177 | | 132 | | 182 | 132 | | | | |
| 300 rpm | 106 | | 78 | | 111 | 80 | | | | |
| 200 rpm | 77 | | 57 | | 83 | 61 | | | | |
| 100 rpm | 46 | | 347 | | 52 | 38 | | | | |
| 6 rpm | 8 | | 7 | | 10 | 8 | | | | |
| 3 rpm | 6 | | 5 | | 7 | 6 | | | | |
| Plastic Viscosity, cP | 71 | | 54 | | 71 | 52 | | | | |
| Yield Pt, lb/100 ft$^2$ | 35 | | 24 | | 40 | 28 | | | | |
| Gels, 10 sec/10 min. | 6/6 | | 6/6 | | 8/8 | 6/7 | | | | |
| Settling in thermocup HR 16 hrs at 150° F. | no | | no | | no | no | | | | |
| 600 rpm | 179 | | 140 | | 184 | 144 | | | | |
| 300 rpm | 109 | | 84 | | 113 | 88 | | | | |
| 200 rpm | 80 | | 62 | | 85 | 66 | | | | |
| 100 rpm | 48 | | 37 | | 52 | 41 | | | | |
| 6 rpm | 8 | | 7 | | 10 | 9 | | | | |
| 3 rpm | 6 | | 5 | | 8 | 7 | | | | |
| Plastic Viscosity, cP | 70 | | 56 | | 71 | 56 | | | | |
| Yield Pt, lb/100 ft$^2$ | 39 | | 32 | | 42 | 32 | | | | |
| Gels, 10 sec/10 min. | 6/6 | | 5/5 | | 8/8 | 7/9 | | | | |
| API filt, ml total | | | 3.5 | | | 6.2 | | | | |
| API filt, ml oil | | | — | | | — | | | | |
| API filt, ml emulsion | | | 3.5 | | | 6.2 | | | | |
| API filt, ml brine | | | — | | | — | | | | |
| HTHP at 150° F., ml | 19.4 | | (0.8 brine) | | | | | | | |
| HTHP at 250° F., ml | | | | | | | | | | |
| 250° F. oil | | | | | | | | | | |
| 250° F. emulsion | | | | | | | | | | |
| 250° F. brine | | | | | | | | | | |
| Comments | | | | | | | | | | |

NOTE:
1. Sample 337 and 338 looked grainy with 15 lb/bbl Synvert V. Concentration was increased to 25 lb/bbl. After hot-rolling at 150° F., #337 and #338 still appear grainy.
2. Mud weight of 339 is 14.7 lb/gal (CsF in 337–340 is 2.366 s.g)
3. Mud weight of 347 is 14.6 lb/gal (CsF in 347–348 is 2.30 s.g)

| Cesium formate, IA - 35 (50/50 mixture) | |
|---|---|
| 175 ml IA - 35 (0.828 sg) - (144.9 grams) | |
| 175 ml Cesium Formate (2.2 sg) - (385 grams) | |
| Mixing Procedure: | |
| 1. | Measure out IA - 35 |
| 1A. | Add Synvis, mix 5 minutes |
| 2. | Add CsF, mix 10 min. |
| 3. | Add Synvert 5, mix 10 minutes |
| 3A. | Add calcium carbonate, mix 10 minutes |
| 4. | Run initial ES, viscosities at 120° F. |
| 5. | Put 10 ml sample in a vial, SA for 24 hrs at 75° F., measure volumes |
| 6. | Hot-roll for 16 hours at 150° F. |
| 7. | Remix, run rheology, ES, API, HTHP at 150° F. |
| 8. | Put vials in oven and static-age at 150° F. for 24 hrs, measure volumes |
| 9. | If 150° F. HTHP is good, run at 250° F. |

50/50 ratio
Mud weight, 13.1 lb/gal

| | Sample # | | | | | | | |
|---|---|---|---|---|---|---|---|---|
| | 313 | 314 | 314A | 314B | 315 | 316 | 317 | 318 |
| IA - 35, grams | 134.9 | 134.9 | 134.9 | 134.9 | 134.9 | 134.9 | 134.9 | 134.9 |
| Cesium Formate, grams | 385 | 385 | 385 | 385 | 385 | 385 | 385 | 385 |
| Integrity Emulsifier, lb/bbl | 10 | 10 | 15 | 20 | 10 | 10 | 10 | 10 |
| Integrity Synvis, lb/bbl | 0.5 | 0.5 | 0.5 | 0.5 | 0.5 | 0.5 | 1 | 1 |
| Witco DTA 350, lb/bbl | 1 | 1.25 | 1.125 | 1.125 | 1.5 | 1.75 | 1 | 1.25 |
| Baroid Baracarb 50, lb/bbl | 50 | 50 | 50 | 50 | 50 | 50 | 50 | 50 |
| Initial ES, volts | 330 | 332 | 353 | 355 | 437 | 402 | 298 | 330 |
| Hot-rolled 16 hrs, ES | 416 | 343 | 284 | 290 | 396 | 427 | 344 | 396 |
| Initial Properties | | | | | | | | |
| 600 rpm at 120° F. | 89 | 102 | 70 | 72 | 108 | 120 | 91 | 104 |
| 300 rpm | 58 | 66 | 40 | 39 | 78 | 83 | 59 | 70 |
| 200 rpm | 47 | 53 | 30 | 28 | 66 | 70 | 48 | 57 |
| 100 rpm | 35 | 42 | 19 | 16 | 53 | 56 | 36 | 44 |
| 6 rpm | 20 | 26 | 4 | 2 | 32 | 31 | 20 | 25 |
| 3 rpm | 17 | 21 | 3 | 1 | 26 | 19 | 18 | 22 |
| Plastic Viscosity, cP | 31 | 36 | 30 | 33 | 30 | 37 | 32 | 34 |
| Yield Pt, lb/100 ft$^2$ | 27 | 30 | 10 | 6 | 48 | 46 | 27 | 36 |
| Gels, 10 sec/10 min. | 23/19 | 25/25 | 4/9 | 2/3 | 19/25 | 19/19 | 17/23 | 23/27 |
| Settling in thermocup | No | No | No | No | No | No | No | No |
| HR 16 hrs at 150° F. | | | | | | | | |
| 600 rpm at 120° F. | 93 | 93 | 82 | 73 | 93 | 95 | 113 | 124 |
| 300 rpm | 67 | 67 | 54 | 40 | 67 | 69 | 81 | 93 |
| 200 rpm | 57 | 57 | 44 | 29 | 58 | 60 | 69 | 81 |
| 100 rpm | 46 | 47 | 34 | 17 | 48 | 49 | 55 | 67 |
| 6 rpm | 23 | 25 | 14 | 3 | 28 | 27 | 22 | 32 |
| 3 rpm | 17 | 19 | 10 | 2 | 20 | 19 | 18 | 24 |
| Plastic Viscosity, cP | 26 | 26 | 28 | 33 | 26 | 26 | 32 | 31 |
| Yield Pt, lb/100 ft$^2$ | 41 | 41 | 26 | 7 | 41 | 43 | 49 | 62 |

-continued

| Cesium formate, IA - 35 (50/50 mixture) | | | | | | | | |
|---|---|---|---|---|---|---|---|---|
| Gels, 10 sec/10 min. | 19/23 | 21/21 | 12/15 | 3/4 | 23/23 | 21/19 | 21/26 | 26/21 |
| API filt, ml total | 1.2 | 1.8 | 5.8 | 2.6 | 2.2 | 1.2 | 0.2 | 3 |
| API filt, ml oil | 0.8 | 1 | 0.7 | 0.6 | 1 | 0.2 | 0.1 | 0.9 |
| API filt, ml emulsion | 0.4 | 0.8 | 5.1 | 2.0 | 1.2 | 1 | 0.1 | 2.1 |
| API filt, ml brine | 0 | 0 | 0 | 0 | 0 | 0 | 0 | 0 |
| HTHP at 150° F., ml | | | | | | | | |
| HTHP at 250° F., ml | | | | | | | | |
| Comments | | oil on top of jar | | | oil on top of jar | oil on top of jar | | |
| 24 hrs at 75° F. | | | | | | | | |
| Total fluid heighth | 38 | 38 | | | 38 | 38 | 38 | 38 |
| free oil heighth | 0.1 | 1.0 | | | 0.1 | 0.1 | 0.1 | 0.1 |
| emusion heighth | 38 | 37 | | | 38 | 38 | 38 | 38 |
| free brine heighth | 0 | 0 | | | 0 | 0 | 0 | 0 |
| free oil, % | 0.3% | 2.6% | | | 0.3% | 0.3% | 0.3% | 0.3% |
| emusion, % | 100.0% | 97.4% | | | 100.0% | 100.0% | 100.0% | 100.0% |
| free brine, % | 0.0% | 0.0% | | | 0.0% | 0.0% | 0.0% | 0.0% |
| 24 hrs at 150° F. | | | | | | | | |
| Total fluid heighth | 38 | 38 | | | 38 | 38 | 38 | 38 |
| free oil heighth | 4 | 4 | | | 3 | 3 | 2 | 2 |
| emusion heighth | 34 | 34 | | | 35 | 35 | 36 | 36 |
| free brine heighth | 0 | 0 | | | 0 | 0 | 0 | 0 |
| free oil, % | 10.5% | 10.5% | | | 7.9% | 7.9% | 5.3% | 5.3% |
| emusion, % | 89.5% | 89.5% | | | 92.1% | 92.1% | 94.7% | 94.7% |
| free brine, % | 0.0% | 0.0% | | | 0.0% | 0.0% | 0.0% | 0.0% |
| 72 hrs at 150° F. | | | | | | | | |
| Total fluid heighth | | | | | | | | |
| free oil heighth | | | | | | | | |
| emusion heighth | | | | | | | | |
| free brine heighth | | | | | | | | |
| free oil, % | | | | | | | | |
| emusion, % | | | | | | | | |
| free brine, % | | | | | | | | |

| | 50/50 ratio Mud weight, 13.1 lb/gal | | | | | |
|---|---|---|---|---|---|---|
| | Sample # | | | | | |
| | 319 | 320 | 321 | 322 | 323 | 324 |
| IA - 35, grams | 134.9 | 134.9 | 134.9 | 134.9 | 134.9 | 134.9 |
| Cesium Formate, grams | 385 | 385 | 385 | 385 | 385 | 385 |
| Integrity Emulsifier, lb/bbl | 10 | 10 | 10 | 10 | 10 | 10 |
| Integrity Synvis, lb/bbl | 1 | 1 | 1.5 | 1.5 | 1.5 | 1.5 |

-continued

| | Cesium formate, IA - 35 (50/50 mixture) | | | | | |
|---|---|---|---|---|---|---|
| Witco DTA 350, lb/bbl | 1.5 | 1.75 | 1 | 1.25 | 1.5 | 1.75 |
| Baroid Baracarb 50, lb/bbl | 50 | 50 | 50 | 50 | 50 | 50 |
| Initial ES, volts | 309 | 377 | 245 | 282 | 263 | 358 |
| Hot-rolled 16 hrs, ES | 346 | 355 | 324 | 268 | 380 | 382 |
| Initial Properties | | | | | | |
| 600 rpm at 120° F. | 115 | 111 | 91 | 117 | 127 | 136 |
| 300 rpm | 77 | 78 | 52 | 74 | 85 | 97 |
| 200 rpm | 64 | 64 | 38 | 59 | 70 | 82 |
| 100 rpm | 49 | 49 | 23 | 43 | 54 | 66 |
| 6 rpm | 27 | 27 | 7 | 23 | 30 | 36 |
| 3 rpm | 22 | 22 | 6 | 19 | 24 | 28 |
| Plastic Viscosity, cP | 38 | 33 | 39 | 43 | 42 | 39 |
| Yield Pt, lb/100 ft$^2$ | 39 | 45 | 13 | 31 | 43 | 58 |
| Gels, 10 sec/10 min. | 24/24 | 23/26 | 7/12 | 21/26 | 26/29 | 29/29 |
| Settling in thermocup HR 16 hrs at 150° F. | No | No | No | No | No | No |
| 600 rpm at 120° F. | 122 | 118 | 133 | 140 | 147 | 148 |
| 300 rpm | 90 | 90 | 98 | 101 | 111 | 111 |
| 200 rpm | 78 | 79 | 83 | 86 | 96 | 97 |
| 100 rpm | 64 | 65 | 68 | 69 | 78 | 78 |
| 6 rpm | 32 | 32 | 28 | 31 | 34 | 34 |
| 3 rpm | 23 | 23 | 22 | 23 | 25 | 25 |
| Plastic Viscosity, cP | 32 | 28 | 35 | 39 | 36 | 37 |
| Yield Pt, lb/100 ft$^2$ | 58 | 62 | 63 | 62 | 75 | 74 |
| Gels, 10 sec/10 min. | 24/19 | 21/18 | 25/31 | 27/258 | 26/26 | 28/26 |
| API filt, ml total | 2 | 1.5 | 2.3 | 2.4 | 1.0 | 0.8 |
| API filt, ml oil | 1 | 1 | 0.5 | 0.8 | 0.3 | 0.6 |
| API filt, ml emulsion | 1 | 0.5 | 1.8 | 1.6 | 0.7 | 0.2 |
| API filt, ml brine | 0 | 0 | 0 | 0 | 0 | 0 |
| HTHP at 150° F., ml | | | | | | |
| HTHP at 250° F., ml | | | | | | |
| Comments | oil on top of jar | oil on top of jar | | | | |
| 24 hrs at 75° F. | | | | | | |
| Total fluid heighth | 38 | 38 | 38 | 38 | 38 | 38 |
| free oil heighth | 0.1 | 0.1 | 1.0 | 0.1 | 0.1 | 0.1 |
| emusion heighth | 38 | 38 | 37 | 38 | 38 | 38 |
| free brine heighth | 0 | 0 | 0 | 0 | 0 | 0 |
| free oil, % | 0.3% | 0.3% | 2.6% | 0.3% | 0.3% | 0.3% |
| emusion, % | 100.0% | 100.0% | 97.4% | 100.0% | 100.0% | 100.0% |
| free brine, % | 0.0% | 0.0% | 0.0% | 0.0% | 0.0% | 0.0% |
| 24 hrs at 150° F. | | | | | | |
| Total fluid heighth | 38 | 38 | 38 | 38 | 38 | 38 |

-continued

| Cesium formate, IA - 35 (50/50 mixture) | | | | | | |
|---|---|---|---|---|---|---|
| free oil heighth | 3 | 2 | 4 | 3 | 2 | 2 |
| emusion heighth | 35 | 36 | 34 | 35 | 36 | 36 |
| free brine heighth | 0 | 0 | 0 | 0 | 0 | 0 |
| free oil, % | 7.9% | 5.3% | 10.5% | 7.9% | 5.3% | 5.3% |
| emusion, % | 92.1% | 94.7% | 89.5% | 92.1% | 94.7% | 94.7% |
| free brine, % | 0.0% | 0.0% | 0.0% | 0.0% | 0.0% | 0.0% |

| Cesium formate, IA - 35 (50/50 mixture) | | | | | | |
|---|---|---|---|---|---|---|
| Mixing Procedure: | | 175 ml IA - 35 (0.828 sg) - (144.9 grams) 175 ml Cesium Formate (2.2 sg) - (385 grams) | | | | 529.9  350 |
| | | 2.2 sg csf | 331.4 | | | |
| 1. Measure out IA - 35 | | 559.24 | 8 | | | 50  18.52 |
| 1A. Add Synvis, mix 5 minutes | | 50 | 18.52 | | | 13.1080 2 |
| 2. Add CsF, mix 10 min. | | 609.24 | 350 | 1.740686 | | 22.5 |
| 3. Add Synvert 5, mix 10 minutes | | 1.6871 | | | | 2.70108 |
| | | | 0.373 | | | |
| 3A. Add calcium carbonate, mix 10 minutes | | 0.828 | 5 | 0.309258 | | |
| | | | 0.626 | | | |
| 4. Run initial ES, viscosities at 120° F. | | 2.2 | 5 | 1.3783 | | |
| 5. Put 10 ml sample in a vial, SA for 24 hrs at 75° F., measure volumes | | | | 1.687558 | | |
| | | | 559.2 | | | |
| 6. Hot-roll for 16 hours at 150° F. | | 2.3 sg csf | 4 | 331.48 | | |
| 7. Remix, run rheology, ES, API, HTHP at 150° F. | | 50 609.2 | 18.52 | | | 14.4999 |
| 8. Put vials in oven and static-age at 150° F. for 24 hrs, measure volumes | | 4 1.687 1 | 350 | 1.740686 | | 1 |
| 9. If 150° F. HTHP is good, run at 250° F. | | 0.828 2.3 | 0.4163 0.5837 | 0.344696 1.34251 1.687206 Additional 0.5 lb/bbl | | |
| | | | | | | 137.995 1 193.484 9 | 114.26 445.015 2 |

| 37/63 Oil/Formate ratio 14.4 lb/gal | | | | | | | | |
|---|---|---|---|---|---|---|---|---|
| | Sample # | | | | | | | |
| | | | | | | H.R. 16 hrs at 250° F. | | |
| | 325 | 326 | 327 | 328 | 329 | 329 | 329 | 330 |
| IA - 35, grams | 87.5 | 87.5 | 87.5 | 87.5 | 87.5 | 87.5 | 87.5 | 87.5 |
| Cesium Formate, grams | 456.9 | 456.9 | 456.9 | 456.9 | 456.9 | 456.9 | 456.9 | |
| Integrity Emulsifier, lb/bbl | 15 | 15 | 15 | 15 | 15 | 15 | 15 | 15 |
| Integrity Synvis, lb/bbl | — | 1 | 2 | 2 | 1 | 1 | | — |
| Witco DTA 350, lb/bbl | — | 1 | 1 | 2 | — | — | — | 1 |
| Baroid Baracarb 50, lb/bbl | 50 | 50 | 50 | 50 | 50 | 50 | 50 | 50 |
| Initial ES, volts | 167 | 395 | 413 | 443 | 303 | 303 | | 378 |
| Hot-rolled 16 hrs, ES | 221 | 372 | 377 | 488 | 284 | 284 | 259 | 324 |

-continued

| | | | | | | | | |
|---|---|---|---|---|---|---|---|---|
| Cesium formate, IA - 35 (50/50 mixture) | | | | | | | | |
| Initial Properties | | | | | | 120° F. | | |
| 600 rpm at 120° F. | 163 | 233 | 300+ | 300+ | 251 | | 247 | 177 |
| 300 rpm | 97 | 142 | 210 | 300+ | 154 | | 156 | 106 |
| 200 rpm | 71 | 107 | 162 | 253 | 116 | | 121 | 78 |
| 100 rpm | 42 | 64 | 104 | 185 | 71 | | 71 | 46 |
| 6 rpm | 6 | 9 | 22 | 66 | 11 | | 13 | 5 |
| 3 rpm | 4 | 6 | 16 | 53 | 8 | | 10 | 3 |
| Plastic Viscosity, cP | 66 | 91 | — | — | 97 | | 91 | 71 |
| Yield Pt., lb/100 ft^2 | 31 | 51 | — | — | 57 | | 65 | 35 |
| Gels, 10 sec/10 min. | 4/5 | 6/7 | 15/18 | 53/81 | 7/9 | | 10/18 | 3/4 |
| Settling in thermocup | | | | | | | | slight sag |
| HR 16 hrs at 150° F. | | | | | | 150° F. | 150° F. | |
| 600 rpm at 120° F. | 177 | 267 | 300+ | 300+ | 273 | 179 | 165 | 200 |
| 300 rpm | 108 | 177 | 260 | 300+ | 180 | 114 | 101 | 128 |
| 200 rpm | 80 | 137 | 208 | 300+ | 140 | 87 | 76 | 99 |
| 100 rpm | 48 | 92 | 140 | 252 | 91 | 54 | 46 | 65 |
| 6 rpm | 8 | 21 | 40 | 98 | 20 | 10 | 8 | 15 |
| 3 rpm | 5 | 16 | 32 | 80 | 15 | 7 | 6 | 11 |
| Plastic Viscosity, cP | 69 | 90 | — | — | 93 | 65 | 64 | 72 |
| Yield Pt., lb/100 ft^2 | 39 | 87 | — | — | 87 | 49 | 37 | 56 |
| Gels, 10 sec/10 min. | 5/6 | 15/33 | 30/57 | 80/114 | 14/17 | 7/8 | 6/6 | 10/11 |
| API filt, ml total | 0.7 | 0.8 | 0 | 0 | 0 | | | 9 |
| API filt, ml oil | 0 | 0 | 0 | 0 | 0 | | | 0 |
| API filt, ml emulsion | 0.7 | 0.8 | 0 | 0 | 0 | | | 9 |
| API filt, ml brine | | | | | | | | |
| HTHP at 150° F., ml | | | | | | | | |
| HTHP at 250° F., ml | | | | | | 12.6 | 7.2 | |
| 250° F. oil | | | | | | 0 | 0 | |
| 250° F. emulsion | | | | | | 11.8 | 6.4 | |
| 250° F. brine | | | | | | 0.8 | 0.8 | |
| Comments 24 hrs at 75° F. | | | | | | | | |
| Total fluid heighth | 39 | 38 | 38 | 38 | 38 | | | 38 |
| free oil heighth | 1.0 | 0.0 | 0.0 | 0.0 | 0.0 | | | 0.0 |
| emusion heighth | 38 | 38 | 38 | 38 | 38 | | | 38 |
| free brine heighth | 0 | 0 | 0 | 0 | 0 | | | 0 |
| free oil, % emusion, % free brine, % 24 hrs at 150° F. | | | | | | | | |
| Total fluid heighth free oil heighth emusion heighth free brine heighth | | | | | | | | |

Cesium formate, IA - 35 (50/50 mixture)

free oil, %
emusion, %
free brine, %
72 hrs at
150° F.

Total fluid
heighth
free oil
heighth
emusion
heighth
free brine
heighth
free oil, %
emusion, %
free brine, %

37/63 Oil/Formate ratio 14.4 lb/gal

| | Sample # | | | | | |
|---|---|---|---|---|---|---|
| | | | Hot roll 16 hrs at 250° F. | | | |
| | 331 | 332 | 332 | 332 | 333 | 334 |
| IA - 35, grams | 82.5 | 82.5 | 82.5 | 82.5 | 82.5 | 82.5 |
| Cesium Formate, grams | 456.9 | 456.9 | 456.9 | 456.9 | 456.9 | 456.9 |
| Integrity Emulsifier, lb/bbl | 20 | 20 | 20 | 20 | 20 | 20 |
| Integrity Synvis, lb/bbl | — | 1 | 1 | 1 | — | 0.5 |
| Witco DTA 350, lb/bbl | 1 | — | — | — | — | — |
| Baroid Baracarb 50, lb/bbl | 50 | 50 | 50 | 50 | 50 | 50 |
| Initial ES, volts | 427 | 285 | 285 | | 351 | 337 310 277 |
| Hot-rolled 16 hrs, ES | 391 | 363 | 363 | 293 | | |
| Initial Properties | | | 120° F. | 120° F. | 150° F. | 120° F. 150° F. |
| 600 rpm at 120° F. | 223 | 247 | | 273 | 218 170 | 230 170 |
| 300 rpm | 137 | 152 | | 172 | 132 103 | 139 103 |
| 200 rpm | 104 | 14 | | 131 | 98 76 | 104 76 |
| 100 rpm | 63 | 69 | | 83 | 59 46 | 62 46 |
| 6 rpm | 9 | 12 | | 15 | 8 8 | 9 8 |
| 3 rpm | 5 | 8 | | 11 | 6 5 | 6 5 |
| Plastic Viscosity, cP | 86 | 95 | | 101 | 86 67 | 91 67 |
| Yield Pt, lb/100 ft$^2$ | 51 | 57 | | 71 | 46 36 | 48 36 |
| Gels, 10 sec/10 min. | 5/6 | 8/9 | | 12/15 | 6/7 6/6 | 6/7 6/6 |
| Settling in thermocup | | | | | | |
| HR 16 hrs at 150° F. | | 150° F. | 120° F. | 120° F. | 150° F. | 120° F. 150° F. |
| 600 rpm at 120° F. | 223 | 280 | 186 | 174 | 222 179 | 245 176 |
| 300 rpm | 140 | 179 | 117 | 103 | 139 112 | 155 111 |
| 200 rpm | 106 | 138 | 89 | 76 | 106 86 | 119 83 |
| 100 rpm | 66 | 89 | 55 | 45 | 67 54 | 76 52 |
| 6 rpm | 11 | 19 | 11 | 8 | 13 11 | 15 10 |
| 3 rpm | 7 | 14 | 8 | 6 | 9 8 | 10 7 |
| Plastic Viscosity, cP | 83 | 101 | 69 | 71 | 83 67 | 90 65 |
| Yield Pt, lb/100 ft$^2$ | 57 | 78 | 48 | 32 | 56 45 | 65 46 |

-continued

| Cesium formate, IA - 35 (50/50 mixture) | | | | | | | | |
|---|---|---|---|---|---|---|---|---|
| Gels, 10 sec/10 min. | 7/8 | 14/18 | 8/9 | 6/7 | 9/10 | 8/9 | 10/15 | 7/8 |
| API filt, ml total | 3.5 | 0 | | | 1.1 | | 0.3 | |
| API filt, ml oil | 0 | 0 | | | 0.0 | | 0.0 | |
| API filt, ml emulsion | 3.5 | 0 | | | 1.1 | | 0.3 | |
| API filt, ml brine | | | | | | | | |
| HTHP at 150° F., ml | | | | | | | | |
| HTHP at 250° F., ml | | | 11.4 | 9.6 | 40.0 | | 23.2 | |
| 250° F. oil | | | 0 | 0 | 0.0 | | 0.0 | |
| 250° F. emulsion | | | 11.4 | 8.6 | 36.0 | | 21.2 | |
| 250° F. brine | | | 0.6 | 1.0 | 4.0 | | 2.0 | |
| Comments 24 hrs at 75° F. | | | | | | | | |
| Total fluid heighth | 38 | 38 | | | | | | |
| free oil heighth | 0.0 | 0.0 | | | | | | |
| emusion heighth | 38 | 38 | | | | | | |
| free brine heighth | 0 | 0 | | | | | | |

| 37/63 Oil/Formate ratio 14.4 lb/gal | | | | | | | | |
|---|---|---|---|---|---|---|---|---|
| | Sample # | | | | | | | |
| | | | | | Synvis added after h.r. | | | |
| | 335 | | 336 | | 334A | | 336A | |
| IA - 35, grams | 82.5 | | 82.5 | | 82.5 | | 82.5 | |
| Cesium Formate, grams | 456.9 | | 456.9 | | 456.9 | | 456.9 | |
| Integrity Emulsifier, lb/bbl | 25 | | 25 | | 20 | | 25 | |
| Integrity Synvis, lb/bbl | — | | 0.5 | | 1.0 | | 1.0 | |
| Witco DTA 350, lb/bbl | — | | — | | — | | — | |
| Baroid Baracarb 50, lb/bbl | 50 | | 50 | | 50 | | 50 | |
| Initial ES, volts | 400 | 278 | 337 | 344 | 405 | 297 | 381 | 312 |
| Hot-rolled 16 hrs, ES | | | | | 297 | 313 | 312 | 353 |
| Initial Properties | 120° F. | 150° F. | 120° F. | 150° F. | 120° F. | 150° F. | 120° F. | 150° F. |
| 600 rpm at 120° F. | 245 | 192 | 264 | 206 | 300+ | 219 | 300+ | 227 |
| 300 rpm | 151 | 119 | 162 | 127 | 194 | 135 | 197 | 141 |
| 200 rpm | 114 | 90 | 122 | 96 | 151 | 102 | 150 | 108 |
| 100 rpm | 70 | 56 | 75 | 59 | 96 | 63 | 94 | 68 |
| 6 rpm | 12 | 10 | 14 | 12 | 18 | 12 | 18 | 14 |
| 3 rpm | 8 | 7 | 10 | 9 | 13 | 8 | 13 | 11 |
| Plastic Viscosity, cP | 94 | 73 | 102 | 79 | — | 84 | — | 86 |
| Yield Pt, lb/100 ft^2 | 57 | 46 | 60 | 48 | — | 51 | — | 55 |
| Gels, 10 sec/10 min. | 8/9 | 8/9 | 10/11 | 9/10 | 12/16 | 8/9 | 13/17 | 11/11 |
| Settling in thermocup | | | | | | | | |

-continued

Cesium formate, IA - 35 (50/50 mixture)

| | | | | | | | | |
|---|---|---|---|---|---|---|---|---|
| HR 16 hrs at 150° F. | | | | | | | | |
| 600 rpm at 120° F. | 241 | 192 | 264 | 210 | 300+ | 200 | 297 | 220 |
| 300 rpm | 152 | 123 | 169 | 133 | 200 | 127 | 191 | 141 |
| 200 rpm | 116 | 94 | 129 | 103 | 157 | 97 | 148 | 109 |
| 100 rpm | 73 | 60 | 83 | 66 | 104 | 62 | 97 | 70 |
| 6 rpm | 15 | 14 | 18 | 15 | 25 | 13 | 22 | 16 |
| 3 rpm | 11 | 10 | 13 | 11 | 20 | 10 | 17 | 12 |
| Plastic Viscosity, cP | 89 | 69 | 95 | 77 | — | 73 | 106 | 79 |
| Yield Pt, lb/100 ft^2 | 63 | 54 | 74 | 56 | — | 54 | 85 | 62 |
| Gels, 10 sec/10 min. | 11/12 | 10/11 | 13/20 | 11/12 | 18/24 | 10/11 | 16/22 | 12/13 |
| API filt, ml total | | 1.4 | | 0.2 | | — | | 0.2 |
| API filt, ml oil | | 0.0 | | 0.0 | | — | | 0.0 |
| API filt, ml emulsion | | 1.4 | | 0.2 | | — | | 0.2 |
| API filt, ml brine | | | | | | | | |
| HTHP at 150° F., ml | | | | | | | | |
| HTHP at 250° F., ml | | 45.6 | | 27.6 | | 12.0 | | 12.0 |
| 250° F. oil | | 0.0 | | 0.0 | | 0.0 | | 0.0 |
| 250° F. emulsion | | 35.6 | | 27.0 | | 10.0 | | 11.0 |
| 250° F. brine | | 10.0 | | 0.6 | | 2.0 | | 1.0 |
| Comments | | | | | | | | |

37/63 Oil/Formate ratio 14.4 lb/gal

| | Sample # | | | |
|---|---|---|---|---|
| | 333 | 334 | 0.5 lb/bbl Synvis added after h.r. 334A | 335 |
| IA - 35, grams | 82.5 | 82.5 | 82.5 | 82.5 |
| Cesium Formate, grams | 456.9 | 456.9 | 456.9 | 456.9 |
| Integrity Emulsifier, lb/bbl | 20 | 20 | 20 | 25 |
| Integrity Synvis, lb/bbl | — | 0.5 | 1.0 | — |
| Witco DTA 350, lb/bbl | — | — | — | — |
| Baroid Baracarb 50, lb/bbl | 50 | 50 | 50 | 50 |
| Initial ES, volts | 351 | 337 | 310 | 277 | 405 | 297 | 400 | 278 |
| Hot-rolled 16 hrs, ES | | | | | | 297 | | 313 |

| Initial Properties | 120° F. | 150° F. | 120° F. | 150° F. | 120° F. | 150° F. | 120° F. | 150° F. |
|---|---|---|---|---|---|---|---|---|
| 600 rpm at 120° F. | 218 | 170 | 230 | 170 | 300+ | 219 | 245 | 192 |
| 300 rpm | 132 | 103 | 139 | 103 | 194 | 135 | 151 | 119 |
| 200 rpm | 98 | 76 | 104 | 76 | 151 | 102 | 114 | 90 |
| 100 rpm | 59 | 46 | 62 | 46 | 96 | 63 | 70 | 56 |
| 6 rpm | 8 | 8 | 9 | 8 | 18 | 12 | 12 | 10 |
| 3 rpm | 6 | 5 | 6 | 5 | 13 | 8 | 8 | 7 |
| Plastic Viscosity, cP | 86 | 67 | 91 | 67 | — | 84 | 94 | 73 |
| Yield Pt, lb/100 ft^2 | 46 | 36 | 48 | 36 | — | 51 | 57 | 46 |

-continued

| Cesium formate, IA - 35 (50/50 mixture) | | | | | | | | |
|---|---|---|---|---|---|---|---|---|
| Gels, 10 sec/10 min. Settling in thermocup HR 16 hrs at 150° F. | 6/7 | 6/6 | 6/7 | 6/6 | 12/16 | 8/9 | 8/9 | 8/9 |
| 600 rpm at 120° F. | 222 | 179 | 245 | 176 | 300+ | 200 | 241 | 192 |
| 300 rpm | 139 | 112 | 155 | 111 | 200 | 127 | 152 | 123 |
| 200 rpm | 106 | 86 | 119 | 83 | 157 | 97 | 116 | 94 |
| 100 rpm | 67 | 54 | 76 | 52 | 104 | 62 | 73 | 60 |
| 6 rpm | 13 | 11 | 15 | 10 | 25 | 13 | 15 | 14 |
| 3 rpm | 9 | 8 | 10 | 7 | 20 | 10 | 11 | 10 |
| Plastic Viscosity, cP | 83 | 67 | 90 | 65 | — | 73 | 89 | 69 |
| Yield Pt., lb/100 ft^2 | 56 | 45 | 65 | 46 | — | 54 | 63 | 54 |
| Gels, 10 sec/10 min. | 9/10 | 8/9 | 10/15 | 7/8 | 18/24 | 10/11 | 11/12 | 10/11 |
| API filt, ml total | | 1.1 | | 0.3 | | — | | 1.4 |
| API filt, ml oil | | 0.0 | | 0.0 | | — | | 0.0 |
| API filt, ml emulsion | | 1.1 | | 0.3 | | — | | 1.4 |
| API filt, ml brine HTHP at 150° F., ml | | | | | | | | |
| HTHP at 250° F., ml | | 40.0 | | 23.2 | | 12.0 | | 45.6 |
| 250° F. oil | | 0.0 | | 0.0 | | 0.0 | | 0.0 |
| 250° F. emulsion | | 36.0 | | 21.2 | | 10.0 | | 35.6 |
| 250° F. brine | | 4.0 | | 2.0 | | 2.0 | | 10.0 |

| 37/63 Oil/Formate ratio 14.4 lb/gal | | |
|---|---|---|
| | Sample # | |
| | 336 | 0.5 lb/bbl Synvis added after h.r. 336A |
| IA - 35, grams | 82.5 | 82.5 |
| Cesium Formate, grams | 456.9 | 456.9 |
| Integrity Emulsifier, lb/bbl | 25 | 25 |
| Integrity Synvis, lb/bbl | 0.5 | 1.0 |
| Witco DTA 350, lb/bbl | — | — |
| Baroid Baracarb 50, lb/bbl | 50 | 50 |
| Initial ES, volts | 337 | 344 | 381 | 312 |
| Hot-rolled 16 hrs, ES | | 312 | | 353 |

| Initial Properties | 120° F. | 150° F. | 120° F. | 150° F. |
|---|---|---|---|---|
| 600 rpm at 120° F. | 264 | 206 | 300+ | 227 |
| 300 rpm | 162 | 127 | 197 | 141 |
| 200 rpm | 122 | 96 | 150 | 108 |
| 100 rpm | 75 | 59 | 94 | 68 |
| 6 rpm | 14 | 12 | 18 | 14 |
| 3 rpm | 10 | 9 | 13 | 11 |
| Plastic Viscosity, cP | 102 | 79 | — | 86 |
| Yield Pt., lb/100 ft^2 | 60 | 48 | — | 55 |

| Cesium formate, IA - 35 (50/50 mixture) | | | | |
|---|---|---|---|---|
| Gels, 10 sec/10 min. Settling in thermocup HR 16 hrs at 150° F. | 10/11 | 9/10 | 13/17 | 11/11 |
| 600 rpm at 120° F. | 264 | 210 | 297 | 220 |
| 300 rpm | 169 | 133 | 191 | 141 |
| 200 rpm | 129 | 103 | 148 | 109 |
| 100 rpm | 83 | 66 | 97 | 70 |
| 6 rpm | 18 | 15 | 22 | 16 |
| 3 rpm | 13 | 11 | 17 | 12 |
| Plastic Viscosity, cP | 95 | 77 | 106 | 79 |
| Yield Pt., lb/100 ft$^2$ | 74 | 56 | 85 | 62 |
| Gels, 10 sec/10 min. | 13/20 | 11/12 | 16/22 | 12/13 |
| API filt, ml total | | 0.2 | | 0.2 |
| API filt, ml oil | | 0.0 | | 0.0 |
| API filt, ml emulsion | | 0.2 | | 0.2 |
| API filt, ml brine | | | | |
| HTHP at 150° F., ml | | | | |
| HTHP at 250° F., ml | | 27.6 | | 12.0 |
| 250° F. oil | | 0.0 | | 0.0 |
| 250° F. emulsion | | 27.0 | | 11.0 |
| 250° F. brine | | 0.6 | | 1.0 |
| Comments | | | | |

| Cesium formate, Escaid 110 (50/50 mixture) |
|---|
| 175 ml Escaid 110 (0.803 sg) - (140.5 grams) |
| 175 ml Cesium Formate (2.2 sg) - (385 grams) |
| Mixing Procedure: |

| | |
|---|---|
| 1. | Measure out Escaid 110 |
| 2. | Add emulsifiers, mix 5 minutes |
| 3. | Add CsF, mix 10 min. on HB, mix on Silverson to 135° F. |
| 3A. | Add Lo-Wate, mix 10 min. on HB |
| 4. | Run initial ES, viscosities at 120° F. |
| 5. | Put 10 ml sample in a vial, SA for 24 hrs at 75° F., measure volumes |
| 6. | Hot-roll for 16 hours at 150° F. |
| 7. | Remix, run rheology, ES, API, HTHP at 150° F. |
| 8. | Put vials in oven and static-age at 150° F. for 24 hrs, measure volumes |
| 9. | If 150° F. HTHP is good, run at 250° F. |

| | Sample # | | | | | |
|---|---|---|---|---|---|---|
| | 273 | 274 | 275 | 276 | 277 | 278 |
| Integrity Synvert IV (Lot# 000329), lb/bbl | 5 | 10 | 10 | 10 | 15 | 15 |
| Witco AX-180-2, lb/bbl | 5 | 5 | 5 | 5 | 5 | 5 |
| Witco DTA 350, lb/bbl dimer trimer | | | 2 | 3 | | 2 |

-continued

| | Cesium formate, Escaid 110 (50/50 mixture) | | | | | |
|---|---|---|---|---|---|---|
| Baroid Baracarb 50, lb/bbl | 50 | 50 | 50 | 50 | 50 | 50 |
| Initial ES, volts @ 120° F. | 363 | 360 | 425 | 572 | 454 | 417 |
| Hot-rolled 16 hrs. ES | 399 | 410 | 378 | 489 | 403 | 329 |
| Jar – S = Settling, 3 = 3 Phases, N = No | S 3 | S 3 | S | S 3 | S | S |
| Initial Properties | | | | | | |
| 600 rpm at 120° F. | 24 | 25 | 29 | 42 | 27 | 29 |
| 300 rpm | 13 | 14 | 17 | 30 | 15 | 15 |
| 200 rpm | 9 | 9 | 12 | 25 | 10 | 11 |
| 100 rpm | 5 | 5 | 8 | 19 | 6 | 6 |
| 6 rpm | 1 | 1 | 2 | 10 | 2 | 1 |
| 3 rpm | 1 | 1 | 1 | 7 | 1 | 1 |
| Plastic Viscosity, cP | 11 | 11 | 12 | 12 | 12 | 14 |
| Yield Pt,lb/100 ft$^2$ | 2 | 3 | 5 | 18 | 3 | 1 |
| Gels, 10 sec/10 min. | 1/1 | 1/1 | 2/2 | 7/8 | 1/2 | 1/1 |
| Settling in thermocup | Y | Y | Y | N | Y | Y |
| HR 64 hrs at 150° F. | | | | | | |
| 600 rpm at 120° F. | 24 | 26 | 31 | 54 | 28 | 28 |
| 300 rpm | 12 | 13 | 18 | 40 | 15 | 15 |
| 200 rpm | 8 | 9 | 14 | 34 | 11 | 11 |
| 100 rpm | 5 | 5 | 9 | 28 | 7 | 6 |
| 6 rpm | 1 | 1 | 3 | 19 | 2 | 1 |
| 3 rpm | 1 | 1 | 2 | 11 | 2 | 1 |
| Plastic Viscosity, cP | 12 | 13 | 13 | 14 | 13 | 13 |
| Yield Pt, lb/100 ft$^2$ | 0 | 0 | 5 | 26 | 2 | 2 |
| Gels, 10 sec/10 min. | 1/1 | 1/1 | 2/2 | 14/8 | 2/2 | 1/1 |
| Settling in Thermocup | Y | Y | N | N | Y | Y |
| Settling in Jar | ¼" | ⅛" | 1/16" | — | 1/16" | ⅛" |
| API filt, ml total | 3.2 | 1.8 | 2.0 | 2.0 | 1.4 | 2.6 |
| API filt, ml oil | 1.6 | 1.6 | 2.0 | 2.0 | 0.4 | 2.6 |
| API filt, ml brine | 1.6 | 0.2 | 0.0 | 0.0 | 1.0 | 0.0 |
| HTHP at 150° F., ml | 8.6 | 6.6 | 8.6 | 8.0 | 9.8 | 13.4 |
| HTHP at 250° F., ml | | 17.2 | | 29.0 | | |
| Static Age - 64 hrs at 75° F. | | | | | | |
| Total fluid height | 32 | 32 | 32 | 32 | 32 | 32 |
| free oil height | 4 | 3 | 7 | 7 | 2 | 3 |
| emulsion height | 28 | 29 | 25 | 25 | 30 | 29 |
| free brine height | 0 | 0 | 0 | 0 | 0 | 0 |
| free oil, % | 13% | 9% | 22% | 22% | 6% | 9% |
| emusion, % | 87.5% | 90.6% | 78.1% | 78.1% | 93.8% | 90.6% |
| free brine, % | 0.0% | 0.0% | 0.0% | 0.0% | 0.0% | 0.0% |
| Total | 100% | 100% | 100% | 100% | 100% | 100% |
| MP = Multiple Phase Emulsion | MP | MP | MP | MP | MP | MP |
| Static Age - 24 hrs at 150° F. | | | | | | |
| Total fluid height | 32 | 32 | 32 | 32 | 32 | 32 |
| free oil height | 7 | 7 | 10 | 8 | 10 | 9 |
| emusion height | 25 | 25 | 22 | 24 | 22 | 23 |
| free brine height | 0 | 0 | 0 | 0 | 0 | 0 |
| free oil, % | 22% | 22% | 31% | 25% | 31% | 28% |
| emusion, % | 78.1% | 78.1% | 68.8% | 75.0% | 68.8% | 71.9% |
| free brine, % | 0.0% | 0.0% | 0.0% | 0.0% | 0.0% | 0.0% |
| Total | 100% | 100% | 100% | 100% | 100% | 100% |
| MP = Multiple Phase Emulsion | MP | MP | MP | MP | MP | MP |

-continued

| Cesium formate, Escaid 110 (50/50 mixture) |
|---|

Difference (64 hrs/24 hrs at 150° F.)

free oil, %
emusion, %
free brine, %

| | Sample # | | | | | |
|---|---|---|---|---|---|---|
| | 279 | 280 | 281 | 282 | 283 | 284 |
| Integrity Synvert IV (Lot# 000329), lb/bbl | 5 | 5 | 5 | 5 | 2.5 | 2.5 |
| Witco AX-180-2, lb/bbl | 7.5 | 10 | 10 | 10 | 10 | 10 |
| Witco DTA 350, lb/bbl dimer trimer | | | 2 | 3 | | 2 |
| Baroid Baracarb 50, lb/bbl | 50 | 50 | 50 | 50 | 50 | 50 |
| Initial ES, volts @ 120° F. | 448 | 390 | 445 | 552 | 360 | 458 |
| Hot-rolled 16 hrs, ES | 398 | 431 | 345 | 288 | 359 | 229 |
| Jar – S = Settling, 3 = 3 Phases, N = No | S | S | N | N | S | S |
| Initial Properties | | | | | | |
| 600 rpm at 120° F. | 26 | 24 | 30 | 47 | 24 | 32 |
| 300 rpm | 14 | 13 | 18 | 33 | 13 | 19 |
| 200 rpm | 9 | 9 | 13 | 28 | 9 | 15 |
| 100 rpm | 5 | 5 | 9 | 21 | 5 | 10 |
| 6 rpm | 1 | 1 | 3 | 9 | 2 | 3 |
| 3 rpm | 1 | 1 | 3 | 6 | 1 | 2 |
| Plastic Viscosity, cP | 12 | 11 | 12 | 14 | 11 | 13 |
| Yield Pt, lb/100 ft$^2$ | 2 | 2 | 6 | 19 | 2 | 6 |
| Gels, 10 sec/10 min. | 1/2 | 1/2 | 3/4 | 6/6 | 1/2 | 3/3 |
| Settling in thermocup | Y | Y | Y | N | Y | N |
| HR 64 hrs at 150° F. | | | | | | |
| 600 rpm at 120° F. | 25 | 25 | 32 | 56 | 25 | 35 |
| 300 rpm | 13 | 13 | 20 | 42 | 13 | 22 |
| 200 rpm | 9 | 9 | 16 | 36 | 9 | 13 |
| 100 rpm | 5 | 5 | 11 | 28 | 5 | 12 |
| 6 rpm | 1 | 1 | 4 | 15 | 1 | 4 |
| 3 rpm | 1 | 1 | 3 | 8 | 1 | 4 |
| Plastic Viscosity, cP | 12 | 12 | 12 | 14 | 12 | 13 |
| Yield Pt, lb/100 ft$^2$ | 1 | 1 | 8 | 28 | 1 | 9 |
| Gels, 10 sec/10 min. | 1/1 | 1/1 | 4/5 | 7/5 | 2/2 | 5/3 |
| Settling in Thermocup | Y | Y | Y | N | Y | N |
| Settling in Jar | ¼" | ¼" | — | ¼" | 5/16" | — |
| API filt, ml total | 3.0 | 3.2 | 2.0 | 2.1 | 2.1 | 2.2 |
| API filt, ml oil | 0.8 | 1.2 | 1.8 | 1.8 | 1.4 | 1.9 |
| API filt, ml brine | 2.2 | 2.0 | 0.2 | 0.2 | 0.7 | 0.3 |
| HTHP at 150° F., ml | 11.6 | 14.6 | 7.0 | 4.4 | 12.0 | 5.6 |
| HTHP at 250° F., ml | | | 15.0 | 12.4 | 20.8 | 14.8 |
| Static Age - 64 hrs at 75° F. | | | | | | |
| Total fluid height | 32 | 32 | 32 | 32 | 32 | 32 |
| free oil height | 3 | 8 | 9 | 10 | 9 | 9 |
| emusion height | 29 | 24 | 23 | 22 | 23 | 23 |
| free brine height | 0 | 0 | 0 | 0 | 0 | 0 |
| free oil, % | 9% | 25% | 28% | 31% | 28% | 28% |

| -continued |
| --- |
| Cesium formate, Escaid 110 (50/50 mixture) |

| | | | | | | |
|---|---|---|---|---|---|---|
| emusion, % | 90.6% | 75.0% | 71.9% | 68.8% | 71.9% | 71.9% |
| free brine, % | 0.0% | 0.0% | 0.0% | 0.0% | 0.0% | 0.0% |
| Total | 100% | 100% | 100% | 100% | 100% | 100% |
| MP = Multiple Phase Emulsion | MP | — | — | — | — | — |
| Static Age - 24 hrs at 150° F. | | | | | | |
| Total fluid height | 32 | 32 | 32 | 32 | 32 | 32 |
| free oil height | 4 | 10 | 10 | 10 | 10 | 10 |
| emusion height | 28 | 22 | 22 | 22 | 22 | 22 |
| free brine height | 0 | 0 | 0 | 0 | 0 | 0 |
| free oil, % | 13% | 31% | 31% | 31% | 31% | 31% |
| emusion, % | 87.5% | 68.8% | 68.8% | 68.8% | 68.8% | 68.8% |
| free brine, % | 0.0% | 0.0% | 0.0% | 0.0% | 0.0% | 0.0% |
| Total | 100% | 100% | 100% | 100% | 100% | 100% |
| MP = Multiple Phase Emulsion | MP | — | — | — | — | — |
| Difference (64 hrs/24 hrs at 150° F.) | | | | | | |
| free oil, % | | | | | | |
| emusion, % | | | | | | |
| free brine, % | | | | | | |

| Cesium formate, IA - 35 (50/50 mixture) |
| --- |

| | |
|---|---|
| 175 ml IA - 35 (0.828 sg) - (144.9 grams) | NOTE: Make up ½ bbl Equivalents |
| 175 ml Cesium Formate (2.2 sg) - (385 grams) | |
| Mixing Procedure: | |

1. Measure out IA - 35
1A. Add Synvis, mix 5 minutes
2. Add CsF, mix 10 min.
3. Add Synvert 5, mix 10 minutes
3A. Add calcium carbonate, mix 10 minutes
4. Run initial ES, viscosities at 120° F.
5. Put 10 ml sample in a vial, SA for 24 hrs at 75° F., measure volumes
6. Hot-roll for 16 hours at 150° F.    NOTE: Make up ½ bbl Equivalents
7. Remix, run rheology, ES, API, HTHP at 150° F.
8. Put vials in oven and static-age at 150° F. for 24 hrs, measure volumes
9. If 150° F. HTHP is good, run at 250° F.    NOTE: Make up ½ bbl Equivalents

| | oil/cs ratio | | | | | |
|---|---|---|---|---|---|---|
| | 50/50 | 50/50 | 50/50 | | 50/50 | 53/47 |
| | | | Sample # | | | |
| | 285 | 285 | 286 | 287 | 287 | 288 | 289 |
| IA - 35, grams | 119.9 | 119.9 | 119.9 | 119.9 | 119.9 | 119.9 | 144.9 |
| Cesium Formate, grams | 385 | 385 | 385 | 385 | 385 | 385 | 385 |
| Integrity Synvert 5, lb/bbl | 25 | 25 | 25 | 25 | 25 | 25 | 25 |
| Integrity Synvis, lb/bbl | 5 | 5 | 5 | 10 | 10 | 10 | 5 |
| Baroid Baracarb 50, lb/bbl | — | — | 50 | — | — | 50 | — |
| Initial ES, volts | 823 | | 680 | 646 | | 595 | 641 |
| Hot-rolled 16 hrs, ES | 494 | | 619 | 551 | | 528 | 509 |

-continued

| | Cesium formate, IA - 35 (50/50 mixture) | | | | | | |
|---|---|---|---|---|---|---|---|
| Initial Properties | | | | | | | |
| 600 rpm at 120° F. | 273 | 164 | 300+ | 300+ | 300+ | 300+ | 142 |
| 300 rpm | 184 | 94 | 230 | 300+ | 290 | 300+ | 85 |
| 200 rpm | 144 | 67 | 182 | 300+ | 230 | 300+ | 64 |
| 100 rpm | 102 | 39 | 130 | 229 | 157 | 300+ | 40 |
| 6 rpm | 39 | 7 | 41 | 81 | 45 | 119 | 10 |
| 3 rpm | 26 | 5 | 37 | 72 | 38 | 105 | 8 |
| Plastic Viscosity, cP | 89 | 70 | — | — | | — | 57 |
| Yield Pt, lb/100 ft^2 | 95 | 24 | — | — | | — | 28 |
| Gels, 10 sec/10 min. | 23/27 | 5/7 | 33/37 | 65/72 | 35/42 | 87/96 | 7/9 |
| Settling in thermocup | N | | N | N | | N | N |
| API filt, ml total | 10 (8 min) | | 0 | 1.5 | | 0 | 10 (2 min) |
| API filt, ml oil | 0 | | 0 | 0 | | 0 | 0 |
| API filt, ml brine | 0 | | 0 | 0 | | 0 | 0 |
| HTHP at 150° F., ml | | | | | | | |
| HTHP at 250° F., ml | | | | | | | |
| HR 16 hrs at 150° F. | | | | | | | |
| 600 rpm at 120° F. | 270 | | 294 | 300+ | | 300+ | 197 |
| 300 rpm | 171 | | 184 | 300+ | | 300+ | 120 |
| 200 rpm | 132 | | 148 | 300+ | | 300+ | 90 |
| 100 rpm | 89 | | 100 | 300+ | | 284 | 60 |
| 6 rpm | 24 | | 28 | 102 | | 95 | 16 |
| 3 rpm | 19 | | 23 | 87 | | 83 | 13 |
| Plastic Viscosity, cP | 99 | | 110 | — | | — | 77 |
| Yield Pt, lb/100 ft^2 | 72 | | 74 | — | | — | 43 |
| Gels, 10 sec/10 min. | 16/21 | | 21/25 | 81/86 | | 74/84 | 11/16 |
| Comments | | | | | | | |
| 24 hrs at 75° F. | | | | | | | |
| Total fluid heighth | 33 | | 34 | 34 | | 33 | 34 |
| free oil heighth | 0 | | 0 | 0 | | 0 | 0 |
| emusion heighth | 33 | | 34 | 34 | | 33 | 34 |
| free brine heighth | 0 | | 0 | 0 | | 0 | 0 |
| free oil, % | 0% | | 0% | 0% | | 0% | 0% |
| emusion, % | 100.0% | | 100.0% | 100.0% | | 100.0% | 100.0% |
| free brine, % | 0.0% | | 0.0% | 0.0% | | 0.0% | 0.0% |
| 24 hrs at 150° F. | | | | | | | |
| Total fluid heighth | 33 | | 34 | 34 | | 33 | 34 |
| free oil heighth | 0 | | 0 | 0 | | 0 | 0 |
| emusion heighth | 33 | | 34 | 34 | | 33 | 34 |
| free brine heighth | 0 | | 0 | 0 | | 0 | 0 |
| free oil, % | 0% | | 0% | 0% | | 0% | 0% |
| emusion, % | 100.0% | | 100.0% | 100.0% | | 100.0% | 100.0% |
| free brine, % | 0.0% | | 0.0% | 0.0% | | 0.0% | 0.0% |
| 72 hrs at 150° F. | | | | | | | |
| Total fluid heighth | 33 | | 34 | 34 | | 33 | 34 |
| free oil heighth | 1 | | 2 | 0 | | 0 | 2 |

| -continued |||||
|---|---|---|---|---|---|
| Cesium formate, IA - 35 (50/50 mixture) |||||
| emusion heighth | 32 | 32 | 34 | 33 | 32 |
| free brine heighth | 0 | 0 | 0 | 0 | 0 |
| free oil, % | 3% | 6% | 0% | 0% | 6% |
| emusion, % | 97.0% | 94.1% | 100.0% | 100.0% | 94.1% |
| free brine, % | 0.0% | 0.0% | 0.0% | 0.0% | 0.0% |
| API filt, ml total | | | | | |
| API filt, ml oil | | | | | |
| API filt, ml brine | | | | | |
| HTHP at 150° F., ml | | | | | |
| HTHP at 250° F., ml | | | | | |
| HR 16 hrs at 150° F. | | | | | |
| 600 rpm at 120° F. | 292 | | | | 200 |
| 300 rpm | 192 | | | | 124 |
| 200 rpm | 151 | | | | 94 |
| 100 rpm | 102 | | | | 59 |
| 6 rpm | 31 | | | | 14 |
| 3 rpm | 25 | | | | 11 |
| Plastic Viscosity, cP | 100 | | | | 76 |
| Yield Pt, lb/100 ft^2 | 92 | | | | 48 |
| Gels, 10 sec/10 min. | 23/26 | | | | 10/12 |
| Comments | | | | | |

| | oil/cs ratio ||||||
|---|---|---|---|---|---|---|---|
| | 53/47 | 48.5/51.5 | 48.5/51.5 | 48.5/51.5 | 48.5/51.5 | 56/44 | 56/44 |
| | | | | Sample # | | | |
| | 290 | 291 | 292 | 293 | 294 | 295 | 296 |
| IA - 35, grams | 144.9 | 94.9 | 94.9 | 94.9 | 94.9 | 144.9 | 144.9 |
| Cesium Formate, grams | 385 | 385 | 385 | 385 | 385 | 385 | 385 |
| Integrity Synvert 5, lb/bbl | 25 | 50 | 50 | 50 | 50 | 50 | 50 |
| Integrity Synvis, lb/bbl | 10 | 5 | 5 | 10 | 10 | 5 | 10 |
| Baroid Baracarb 50, lb/bbl | — | — | 50 | — | 50 | — | — |
| Initial ES, volts | 1032 | 452 | 392 | 409 | 337 | 651 | 698 |
| Hot-rolled 16 hrs, ES | 660 | 469 | 442 | 373 | 341 | 490 | 645 |
| Initial Properties | | | | | | | |
| 600 rpm at 120° F. | 300+ | 262 | 300+ | 300+ | 300+ | 114 | 300+ |
| 300 rpm | 300+ | 164 | 193 | 300+ | 300+ | 68 | 230 |
| 200 rpm | 287 | 129 | 149 | 300+ | 300+ | 50 | 184 |
| 100 rpm | 243 | 86 | 100 | 300+ | 221 | 33 | 126 |
| 6 rpm | 83 | 24 | 28 | 115 | 73 | 11 | 38 |
| 3 rpm | 73 | 19 | 22 | 98 | 61 | 9 | 31 |
| Plastic Viscosity, cP | — | 98 | — | — | — | 46 | — |
| Yield Pt, lb/100 ft^2 | — | 66 | — | — | — | 22 | — |
| Gels, 10 sec/10 min. | 64/69 | 19/25 | 21/28 | 89/103 | 57/76 | 4/4 | 29/36 |
| Settling in thermocup | N | N | N | N | N | N | N |
| API filt, ml total | 1.5 | 10 (2 min) | 0.0 | 7.0 | 0.0 | 6.9 | 10 (2 min) |
| API filt, ml oil | 0 | 0 | 0 | 0 | 0 | 0 | 0 |

-continued

| Cesium formate, IA - 35 (50/50 mixture) | | | | | | | |
|---|---|---|---|---|---|---|---|
| API filt, ml brine | 0 | 0 | 0 | 0 | 0 | 0 | 0 |
| HTHP at 150° F., ml | | | | | | | |
| HTHP at 250° F., ml | | | | | | | |
| HR 16 hrs at 150° F. | | | | | | | |
| 600 rpm at 120° F. | 300+ | 300+ | 300+ | 300+ | 300+ | 152 | 300+ |
| 300 rpm | 300+ | 206 | 257 | 300+ | 300+ | 89 | 203 |
| 200 rpm | 243 | 160 | 202 | 300+ | 300+ | 65 | 155 |
| 100 rpm | 177 | 109 | 140 | 263 | 298 | 41 | 106 |
| 6 rpm | 69 | 33 | 43 | 89 | 100 | 11 | 32 |
| 3 rpm | 59 | 29 | 36 | 78 | 88 | 9 | 27 |
| Plastic Viscosity, cP | — | — | — | — | — | 63 | — |
| Yield Pt, lb/100 ft$^2$ | — | — | — | — | — | 26 | — |
| Gels, 10 sec/10 min. | 46/53 | 24/33 | 33/42 | 70/80 | 78/88 | 3/4 | 25/32 |
| Comments | | | | | | | |
| 24 hrs at 75° F. | | | | | | | |
| Total fluid heighth | 34 | 35 | 34 | 33 | 33 | 34 | 34 |
| free oil heighth | 0 | 0 | 0 | 0 | 0 | 0 | 0 |
| emusion heighth | 34 | 35 | 34 | 33 | 33 | 34 | 34 |
| free brine heighth | 0 | 0 | 0 | 0 | 0 | 0 | 0 |
| free oil, % | 0% | 0% | 0% | 0% | 0% | 0% | 0% |
| emusion, % | 100.0% | 100.0% | 100.0% | 100.0% | 100.0% | 100.0% | 100.0% |
| free brine, % | 0.0% | 0.0% | 0.0% | 0.0% | 0.0% | 0.0% | 0.0% |
| 24 hrs at 150° F. | | | | | | | |
| Total fluid heighth | 34 | 35 | 34 | 33 | 33 | 34 | 34 |
| free oil heighth | 0 | 0 | 1 | 0 | 0 | 1 | 0 |
| emusion heighth | 34 | 35 | 33 | 33 | 33 | 33 | 34 |
| free brine heighth | 0 | 0 | 0 | 0 | 0 | 0 | 0 |
| free oil, % | 0% | 0% | 3% | 0% | 0% | 3% | 0% |
| emusion, % | 100.0% | 100.0% | 97.1% | 100.0% | 100.0% | 97.1% | 100.0% |
| free brine, % | 0.0% | 0.0% | 0.0% | 0.0% | 0.0% | 0.0% | 0.0% |
| 72 hrs at 150° F. | | | | | | | |
| Total fluid heighth | 34 | 35 | 34 | 33 | 33 | 34 | 34 |
| free oil heighth | 0 | 2 | 2 | 0 | 0 | 5 | 0 |
| emusion heighth | 34 | 33 | 32 | 33 | 33 | 29 | 34 |
| free brine heighth | 0 | 0 | 0 | 0 | 0 | 0 | 0 |
| free oil, % | 0% | 6% | 6% | 0% | 0% | 15% | 0% |
| emusion, % | 100.0% | 94.3% | 94.1% | 100.0% | 100.0% | 85.3% | 100.0% |
| free brine, % | 0.0% | 0.0% | 0.0% | 0.0% | 0.0% | 0.0% | 0.0% |
| HR 16 hrs at 150° F. | | | | | | | |
| 600 rpm at 120° F. | | 300+ | | | | 144 | |
| 300 rpm | | 240 | | | | 83 | |
| 200 rpm | | 189 | | | | 61 | |
| 100 rpm | | 129 | | | | 38 | |
| 6 rpm | | 41 | | | | 9 | |
| 3 rpm | | 34 | | | | 7 | |
| Plastic Viscosity, cP | | | | | | 61 | |
| Yield Pt, lb/100 ft$^2$ | | — | | | | 22 | |

| Cesium formate, IA - 35 (50/50 mixture) | | |
|---|---|---|
| Gels, 10 sec/10 min. | 32/38 | 7/9 |
| Comments | | |

| Cesium formate, Escaid 110 (50/50 mixture) | |
|---|---|
| 175 ml Escaid 110 (0.803 sg) - (140.5 grams) | |
| 175 ml Cesium Formate (2.2 sg) - (385 grams) | |
| Mixing Procedure: | |
| 1. | Measure out Escaid 110 |
| 2. | Add emulsifiers, mix 5 minutes, add Barablock, mix 10 minutes |
| 3. | Add CsF, mix 10 min. on HB, mix on Silverson to 135° F. |
| 3A. | Add Lo-Wate, mix 10 min. on HB |
| 4. | Run initial ES, viscosities at 120° F. |
| 5. | Put 10 ml sample in a vial, SA for 24 hrs at 75° F., measure volumes |
| 6. | Hot-roll for 16 hours all 50° F. |
| 7. | Remix, run rheology, ES, API, HTHP at 150° F. |
| 8. | Put vials in oven and static-age at 150° F. for 24 hrs, measure volumes |
| 9. | If 150° F. HTHP is good, run at 250° F. |

| | Sample # | | | | | |
|---|---|---|---|---|---|---|
| | 261 | 262 | 262 | 264 | 265 | 266 |
| Integrity Synvert IV (Lot # 000329), lb/bbl | 10 | 15 | 20 | 15 | | |
| Rhodia Miranol CS, lb/bbl | | | | | 7 | 10.5 |
| Witco AX-180-2, lb/bbl | | | | | | |
| Witco DTA 350, lb/bbl dimer trimer | | | | 3 | | |
| Baroid Baracarb 50, lb/bbl | 50 | 50 | 50 | 50 | 50 | 50 |
| Initial ES, volts | 285 | 306 | 355 | 327 | 8 | 1 |
| Hot-rolled 16 hrs, ES | 320 | 350 | 314 | 376 | 2 | 1 |
| Initial Properties | | | | | | |
| 600 rpm at 120° F. | 26 | 25 | 25 | 27 | 64 | 66 |
| 300 rpm | 13 | 12 | 13 | 13 | 40 | 41 |
| 200 rpm | 9 | 8 | 9 | 8 | 32 | 32 |
| 100 rpm | 5 | 4 | 4 | 4 | 22 | 23 |
| 6 rpm | 1 | 1 | 1 | 0 | 7 | 8 |
| 3 rpm | 1 | 1 | 1 | 0 | 4 | 5 |
| Plastic Viscosity, cP | 13 | 13 | 12 | 14 | 24 | 25 |
| Yield Pt,lb/100 ft^2 | 0 | −1 | 1 | −1 | 16 | 16 |
| Gels, 10 sec/10 min. | 0/1 | 0/1 | 1/1 | 1/1 | 6/4 | 6/5 |
| Settling in thermocup | yes | yes | yes | yes | no | no |
| API filt, ml total | 4.8 | 4.1 | 2.7 | 2.7 | 11 (1 min) | 10 (1 min) |
| API filt, ml oil | — | — | — | — | — | — |
| API filt, ml brine | — | — | — | — | 4.2 | 7.0 |

-continued

| Cesium formate, Escaid 110 (50/50 mixture) | | | | | | |
|---|---|---|---|---|---|---|
| HR 16 hrs at 150° F. | | | | | | |
| 600 rpm at 120° F. | 26 | 26 | 27 | 42 | 63 | 54 |
| 300 rpm | 14 | 13 | 14 | 25 | 40 | 34 |
| 200 rpm | 9 | 8 | 9 | 20 | 31 | 28 |
| 100 rpm | 5 | 5 | 5 | 14 | 19 | 20 |
| 6 rpm | 1 | 1 | 1 | 3 | 6 | 6 |
| 3 rpm | 1 | 1 | 1 | 3 | 4 | 3 |
| Plastic Viscosity, cP | 12 | 13 | 13 | 17 | 23 | 20 |
| Yield Pt, lb/100 ft$^2$ | 2 | 0 | 1 | 8 | 17 | 14 |
| Gels, 10 sec/10 min. | 1/1 | 1/1 | 1/1 | 1/1 | 4/5 | 5/4 |
| Comments | settling | settling | settling | ¼ inch oil | 3 phases | 3 phases |
| 24 hrs at 75° F. | | | | | | |
| Total fluid heighth | 32 | 33 | 33 | 32 | 32 | 32 |
| free oil heighth | 2 | 2 | 2 | 2 | 0 | 0 |
| emusion heighth | 28 | 29 | 29 | 30 | 21 | 21 |
| free brine heighth | 0 | 0 | 0 | 0 | 11 | 11 |
| free oil, % | 6% | 6% | 6% | 6% | 0% | 0% |
| emusion, % | 87.5% | 87.9% | 87.9% | 93.8% | 65.6% | 65.6% |
| free brine, % | 0.0% | 0.0% | 0.0% | 0.0% | 34.4% | 34.4% |
| 24 hrs at 150° F. | | | | | | |
| Total fluid heighth | 32 | 33 | 33 | 32 | 32 | 32 |
| free oil heighth | 2 | 4 | 3 | 5 | 0 | 0 |
| emusion heighth | 30 | 29 | 30 | 27 | 21 | 20 |
| free brine heighth | 0 | 0 | 0 | 0 | 11 | 12 |
| free oil, % | 6% | 12% | 9% | 16% | 0% | 0% |
| emusion, % | 93.8% | 87.9% | 90.9% | 84.4% | 65.6% | 62.5% |
| free brine, % | 0.0% | 0.0% | 0.0% | 0.0% | 34.4% | 37.5% |
| Difference (72 hrs/24 hrs at 150° F.) | | | | | | |
| free oil, % | 0% | 6% | 3% | 9% | 0% | 0% |
| emusion, % | 6% | 0% | 3% | −9% | 0% | −3% |
| free brine, % | 0% | 0% | 0% | 0% | 0% | 3% |

| | Sample # | | | | | |
|---|---|---|---|---|---|---|
| | 267 | 268 | 269 | 270 | 271 | 272 |
| Integrity | | | | | | |
| Synvert IV (Lot# 000329), lb/bbl | | | | | | |
| Rhodia Miranol CS, lb/bbl | 14 | 10.5 | | | | |
| Witco AX-180-2, lb/bbl | | | 7 | 10.5 | 14 | 10.5 |
| Witco DTA 350, lb/bbl | | 3 | | | | 3 |
| dimer trimer | | | | | | |
| Baroid Baracarb 50, lb/bbl | 50 | 50 | 50 | 50 | 50 | 50 |
| Initial ES, volts | 1 | 37 | 151 | 318 | 349 | 345 |
| Hot-rolled 16 hrs, ES | 0 | 18 | 175 | 351 | 419 | 321 |

-continued

| | Cesium formate, Escaid 110 (50/50 mixture) | | | | | |
|---|---|---|---|---|---|---|
| Initial Properties | | | | | | |
| 600 rpm at 120° F. | 66 | 67 | 30 | 24 | 25 | 94 |
| 300 rpm | 42 | 47 | 17 | 13 | 13 | 70 |
| 200 rpm | 34 | 50 | 13 | 9 | 9 | 59 |
| 100 rpm | 24 | 31 | 8 | 6 | 6 | 46 |
| 6 rpm | 8 | 2 | 2 | 1 | 1 | 15 |
| 3 rpm | 4 | 2 | 2 | 1 | 1 | 6 |
| Plastic Viscosity, cP | 24 | 20 | 13 | 11 | 12 | 24 |
| Yield Pt, lb/100 ft$^2$ | 18 | 27 | 4 | 2 | 1 | 46 |
| Gels, 10 sec/10 min. | 6/4 | 5/12 | 2/3 | 1/1 | 1/1 | 9/7 |
| Settling in thermocup | no | no | no | yes | yes | no |
| API filt, ml total | 10 (1 min) | 1.9 | 2.6 | 1/1 | 0.9 | 0.4 |
| API filt, ml oil | — | 0.6 | — | — | — | — |
| API filt, ml brine | 2.5 | 0.3 | — | — | — | — |
| HR 16 hrs at 150° F. | | | | | | |
| 600 rpm at 120° F. | 62 | 67 | 33 | 28 | 28 | 79 |
| 300 rpm | 39 | 42 | 19 | 16 | 16 | 61 |
| 200 rpm | 32 | 37 | 15 | 12 | 11 | 53 |
| 100 rpm | 22 | 26 | 10 | 8 | 7 | 42 |
| 6 rpm | 7 | 2 | 3 | 2 | 2 | 16 |
| 3 rpm | 4 | 2 | 2 | 2 | 2 | 7 |
| Plastic Viscosity, cP | 23 | 25 | 14 | 12 | 12 | 18 |
| Yield Pt, lb/100 ft$^2$ | 16 | 17 | 5 | 4 | 4 | 43 |
| Gels, 10 sec/10 min. | 6/5 | 2/9 | 3/4 | 3/3 | 2/2 | 9/6 |
| Comments | 3 phases | 2 phases | sagging | sagging | sagging | ⅜ inch oil |
| 24 hrs at 75° F. | | | | | | |
| Total fluid heighth | 32 | 32 | 32 | 32 | 32 | 32 |
| free oil heighth | 0 | 12 | 4 | 4 | 4 | 5 |
| emusion heighth | 23 | 20 | 28 | 28 | 28 | 27 |
| free brine heighth | 9 | 0 | 0 | 0 | 0 | 0 |
| free oil, % | 0% | 38% | 13% | 13% | 13% | 16% |
| emusion, % | 71.9% | 62.5% | 87.5% | 87.5% | 87.5% | 84.4% |
| free brine, % | 28.1% | 0.0% | 0.0% | 0.0% | 0.0% | 0.0% |
| 24 hrs at 150° F. | | | | | | |
| Total fluid heighth | 32 | 32 | 32 | 32 | 32 | 32 |
| free oil heighth | 0 | 12 | 7 | 5 | 5 | 12 |
| emusion heighth | 22 | 20 | 25 | 27 | 27 | 20 |
| free brine heighth | 10 | 0 | 0 | 0 | 0 | 0 |
| free oil, % | 0% | 38% | 22% | 16% | 16% | 38% |
| emusion, % | 68.8% | 62.5% | 78.1% | 84.4% | 84.4% | 62.5% |
| free brine, % | 31.3% | 0.0% | 0.0% | 0.0% | 0.0% | 0.0% |
| Difference (72 hrs/24 hrs at 150° F.) | | | | | | |
| free oil, % | 0% | 0% | 9% | 3% | 3% | 22% |
| emusion, % | −3% | 0% | −9% | −3% | −3% | −22% |
| free brine, % | 3% | 0% | 0% | 0% | 0% | 0% |

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A drilling fluid or mud comprising at least one alkali metal formate or monovalent carboxylic salt and at least one emulsifier and at least one sealing or fluid loss additive and at least one hydrocarbon-based fluid, wherein the at least one hydrocarbon-based fluid is partially or totally emulsified into an aqueous fluid containing the at least one alkali metal formate or monovalent carboxylic salt.

2. A drilling fluid comprising at least one alkali metal formate and at least one emulsifier, and at least one sealing or fluid loss additive and at least one hydrocarbon-based fluid.

3. The drilling fluid of claim 2, further comprising at least one synthetic mud fluid.

4. The drilling fluid of claim 2, wherein said alkali metal formate comprises potassium formate.

5. The drilling fluid of claim 2, wherein said drilling fluid further comprises at least one acid.

6. The drilling fluid of claim 2, further comprising at least one solid weighting material, at least one wetting agent, at least one organo clay, at least one filtration control agent, at least one polymer, or combinations thereof.

7. The drilling fluid of claim 2, wherein said emulsifier comprises a dimer trimer acid, imadazoline, tall oil, or combinations thereof.

8. The drilling fluid of claim 2, wherein said hydrocarbon-based fluid comprises diesel oil.

9. The drilling fluid of claim 2, wherein said hydrocarbon-based fluid comprises at least one synthetic oil.

10. The drilling fluid of claim 5, wherein said acid is formic acid or an acid derivative thereof.

11. The drilling fluid of claim 1, wherein said alkali metal formate is less than fully saturated in said drilling fluid.

12. A method to drill a well comprising drilling said well in the presence of the drilling fluid of claim 1.

13. A method to drill a well comprising drilling said well in the presence of the drilling fluid of claim 2.

14. A method to reduce the solids content in a drilling fluid comprising substituting at least a portion of said solid weighting material with an aqueous solution comprising the drilling fluid of claim 2.

15. A drilling fluid or mud made by mixing at least one alkali metal formate and at least one emulsifier and at least one sealing or fluid loss additive and at least one hydrocarbon-based fluid.

16. The drilling fluid or mud of claim 1, wherein said drilling fluid or mud is a mixture of hydrocarbon-based fluid and aqueous-based solution present at a ratio of 65% by volume hydrocarbon fluid: 35% aqueous-based solution to 1% by volume hydrocarbon fluid: 99% by volume aqueous based solution.

17. The drilling fluid of claim 2, wherein said drilling fluid is a hydrocarbon-water emulsion.

18. The drilling fluid of claim 2, wherein said drilling fluid is a mixture of hydrocarbon-based fluid and aqueous-based solution present at a ratio of 65% by volume hydrocarbon fluid: 35% aqueous-based solution to 1% by volume hydrocarbon fluid: 99% by volume aqueous based solution.

19. The drilling fluid or mud of claim 1, wherein no solid weighting material is present.

20. The drilling fluid of claim 2, wherein no solid weighting material is present.

21. The drilling fluid of claim 2, wherein the at least one alkali metal formate is partially or totally emulsified into the hydrocarbon-based fluid.

22. The drilling fluid of claim 2, wherein the at least one hydrocarbon-based fluid is partially or totally emulsified into an aqueous fluid containing the at least one alkali metal formate.

* * * * *